（12）United States Patent
Kim et al.

(10) Patent No.: US 9,659,130 B2
(45) Date of Patent: May 23, 2017

(54) LAYOUT DESIGN SYSTEM FOR GENERATING LAYOUT DESIGN OF SEMICONDUCTOR DEVICE

(71) Applicant: Samsung Electronics Co., Ltd., Suwon-Si, Gyeonggi-Do (KR)

(72) Inventors: Jin-Tae Kim, Daejeon (KR); Jae-Woo Seo, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/521,928

(22) Filed: Oct. 23, 2014

(65) Prior Publication Data

US 2015/0205901 A1    Jul. 23, 2015

(30) Foreign Application Priority Data

Jan. 22, 2014    (KR) .................. 10-2014-0007788

(51) Int. Cl.
*G06F 17/50*    (2006.01)

(52) U.S. Cl.
CPC ...... *G06F 17/5072* (2013.01); *G06F 17/5068* (2013.01)

(58) Field of Classification Search
CPC .. G06F 17/5068; G06F 17/5081; G03F 1/144; G03F 1/36; H01L 27/0207
USPC ................... 716/54, 55, 119, 139
See application file for complete search history.

(56) References Cited

U.S. PATENT DOCUMENTS

| | | | |
|---|---|---|---|
| 7,301,210 B2 | 11/2007 | Abadeer et al. | |
| 7,625,790 B2 | 12/2009 | Yang | |
| 7,829,951 B2 | 11/2010 | Song et al. | |
| 7,932,567 B2 | 4/2011 | Mizumura et al. | |
| 2007/0004147 A1* | 1/2007 | Toubou et al. | 438/261 |
| 2007/0111455 A1 | 5/2007 | Kim et al. | |
| 2007/0231711 A1* | 10/2007 | Aton et al. | 430/5 |
| 2007/0284618 A1* | 12/2007 | Chang et al. | 257/202 |
| 2011/0193234 A1* | 8/2011 | Chen et al. | 257/773 |
| 2013/0174103 A1 | 7/2013 | Shieh et al. | |
| 2013/0175584 A1 | 7/2013 | Ho et al. | |
| 2013/0175618 A1 | 7/2013 | Cheng et al. | |
| 2013/0181300 A1 | 7/2013 | Mor et al. | |
| 2013/0263077 A1 | 10/2013 | Baek et al. | |
| 2014/0001564 A1* | 1/2014 | Song | G06F 17/5081 257/369 |
| 2014/0327081 A1* | 11/2014 | Hsieh et al. | 257/368 |

FOREIGN PATENT DOCUMENTS

| | | |
|---|---|---|
| KR | 20060112853 A | 11/2006 |
| KR | 20070107336 A | 11/2007 |

\* cited by examiner

*Primary Examiner* — Vuthe Siek

(74) *Attorney, Agent, or Firm* — Harness, Dickey & Pierce, P.L.C.

(57) ABSTRACT

According to example embodiments, a layout design system includes a processor, a storage module configured to store a standard cell design, and a generation module. The standard cell design includes an active area and a normal gate area on the active area. The generation module is configured to receive the standard cell design, to adjust a width of an active cut design crossing the active area of the standard cell design, and to output a chip design including a design element using the processor. The design element includes the active cut design having the width adjusted.

16 Claims, 29 Drawing Sheets

1200

1300

1400

LAYOUT DESIGN SYSTEM FOR GENERATING LAYOUT DESIGN OF SEMICONDUCTOR DEVICE

CROSS-REFERENCE TO RELATED APPLICATION

This application claims priority under 35 U.S.C. §119 to Korean Patent Application No. 10-2014-0007788, filed on Jan. 22, 2014, in the Korean Intellectual Property Office, the entire contents of which are herein incorporated by reference.

BACKGROUND

1. Field

The present disclosure relates to a layout design system, and/or more particularly, to a layout design system for generating a layout design of a semiconductor device.

2. Description of Related Art

Along with the microfabrication tendency of semiconductor device manufacturing techniques, demands for miniaturized semiconductor devices are gradually increasing. In order to manufacture miniaturized semiconductor devices, a layout design for securing the reliability of a finished device is desired.

SUMMARY

The present disclosure relates to a layout design system for generating a layout design of a semiconductor device, which can secure the reliability of a final product.

The above and other features will be described in or be apparent from the following description of example embodiments.

According to example embodiments, a layout design system includes a processor a storage module, and a generation module. The storage module is configured to store a standard cell design. The standard cell design include an active area and a normal gate area on the active area. The generation module is configured to receive the standard cell design. The generation module is configured to adjust a width of an active cut design crossing the active area of the standard cell design. The generation module is configured to output a chip design including a design element using the processor. The design element includes the active cut design having the width adjusted.

In example embodiments, the standard cell design may include a first standard cell design and a second standard cell design. The first standard cell design may include a first active area extending in a first direction. The second standard cell design may include a second active area extending in the first direction. The first and second active areas may be spaced apart from each other in the first direction. The active cut design may be between the first standard cell design and the second standard cell design. The generation module may be configured to adjust the width of the active cut design using a marker.

In example embodiments, the active cut design may include a first part spaced apart from a second part in the first direction. The first part may be one end of the active cut design facing the first active area. The second part may be an other end of the active cut design facing the second active area. The marker may include a first marker and a second marker. The generation module may be configured to adjust a width of the first part of the active cut design in the first direction using the first marker. The generation module may be configured to adjust a width of the second part of the active cut design in the first direction using the second marker.

In example embodiments, the first marker may be generated on a boundary between the first active area and the first part of the active cut design so as to overlap with the first active area and the first part of the active cut design. The second marker may be generated on a boundary between the second active area and the second part of the active cut design so as to overlap with the second active area and the second part of the active cut design.

In example embodiments, the first standard cell design may further include a first normal gate area on the first active area, the first normal gate area may extend in a second direction crossing the first direction, and the generation module may be configured to adjust a distance between the first normal gate area and the first part using the first marker.

In example embodiments, the first standard cell design may further include a first dummy gate area on the first active area, the first dummy gate area may be spaced apart from the first normal gate area in the first direction, the first dummy gate area may be between the first normal gate area and the first part, and the first marker may be arranged so it does not overlap with the first dummy gate area.

In example embodiments, the first standard cell design may further include a first active fin extending in the first direction on the first active area, and the generation module may be configured to adjust a length of the first active fin in the first direction using the first marker.

In example embodiments, the length of the first active fin in the first direction may be equal to a length of the first active area in the first direction.

In example embodiments, the standard cell may further include the design element.

In example embodiments, the generation module may be configured to generate the design element.

According to example embodiments, a layout design system includes a processor, a storage module, and a displacement module. The storage module is configured to store a plurality of standard cell designs and a plurality of candidate active cut designs. The plurality of candidate active cut designs have different shapes. Each of the standard cell designs includes an active area and a normal gate area on the active area. The displacement module is configured to place the plurality of standard cell designs using the processor according to a defined requirement. The displacement module is configured to select one of the plurality of candidate active cut designs and to dispose the selected candidate active cut design between the plurality of standard cell designs.

In example embodiments, each one of the standard cell designs may include a first standard cell design and a second standard cell design. The first standard cell design may include a first active area extending in a first direction. The second standard cell design may include a second active area extending in the first direction. The first and second active areas may be spaced apart from each other in the first direction. The displacement module may be configured to dispose the selected candidate active cut design between the first standard cell design and the second standard cell design.

In example embodiments, the layout design system may include a generation module. The generation module may be configured to generate a first maker and a second marker. The first marker may be on a boundary between the first standard cell design and the selected candidate active cut design. The second maker may be on a boundary between the second standard cell design and the selected candidate active cut design.

In example embodiments, the displacement module and the generation module may be stored in the storage module or stored in an other storage module separated from the storage module.

In example embodiments, the layout design system may include an integration module. The integration module may be configured to implement the displacement module and the generation module.

According to example embodiments, a layout design system includes a processor, a storage module, and a generation module. The storage module is configured to store at least one standard cell design. The standard cell design includes at least one gate area on an active area. The generation module is configured to generate a chip design including a design element using the processor by adjusting a width of an active cut design crossing the active area. The design element includes the active cut design having the width adjusted.

In example embodiments, the active area may include a first active area spaced apart in a first direction from a second active area. The standard cell design may include the active cute design. The active cut design may be between the first and second active area. The active cut design may include a first part spaced apart in the first direction from a second part. The generation module may be configured to adjust the width of the active cut design by adjusting a width in the first direction of the first part using a first marker and adjusting a width in the first direction of the second part using a second marker. The first marker may overlap a boundary between the first part and the first active area. The second marker may overlap a boundary between the second part and the second active area. The first and second markers may be arranged so they do not overlap the at least one gate.

In example embodiments, the generation module may be configured to adjust the width of the active design without adjusting a dimension of the at least one gate. The generation module may be configured to adjust the width of the active cut design using a marker that overlaps at least one boundary between the active cut design and the active area.

In example embodiments, the layout design system may further include displacement module. The at least one standard cell design may be a plurality of standard cell designs. The storage module may be configure to store the plurality of standard cell designs and a plurality of active cut designs. The plurality of candidate active cut designs may have different shapes. The displacement module may be configured to place the plurality of standard cell designs using the processor according to a defined requirement. The displacement module may be configured to select one of the plurality of candidate active cut designs and to dispose the selected candidate active cut design between the plurality of standard cell designs such that the selected candidate active cut design is the active cut design crossing the active area of the standard cell. The generation module may be configured to adjust a width of the selected candidate active cut design using a marker without affecting a dimension of the at least one gate.

In example embodiments, the storage module may be one of a non-volatile memory device, a hard disk drive, and a magnetic storage device.

BRIEF DESCRIPTION OF THE DRAWINGS

The above and other features of example embodiments will become more apparent by describing in detail the attached drawings in which.

DETAILED DESCRIPTION OF EXAMPLE EMBODIMENTS

Figure 1:
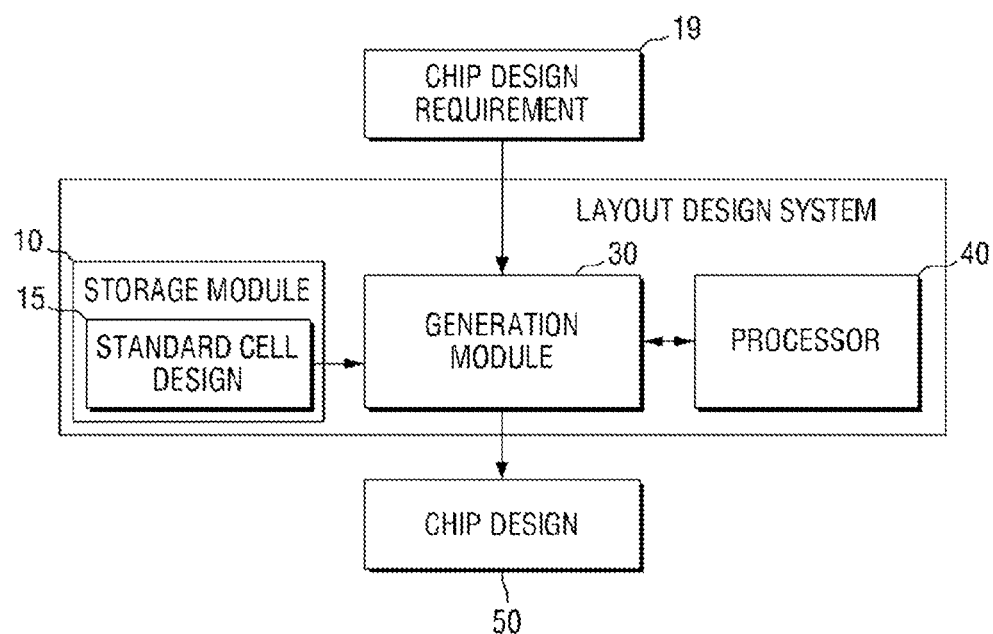
FIG. 1 is a block diagram of a layout design system according to example embodiments.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference numerals in the drawings denote like elements, and thus their description may be omitted.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "includes", "including", and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Other words used to describe the relationship between elements or layers should be interpreted in a like fashion (e.g., "between" versus "directly between," "adjacent" versus "directly adjacent," "on" versus "directly on"). As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

The term "unit" or "module", as used herein, means, but is not limited to, a software and/or hardware component, such as a field programmable gate array (FPGA) or an application specific integrated circuit (ASIC), which performs certain tasks. A unit or module may advantageously be configured to reside in a tangible addressable storage medium and be configured to execute on one or more processors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units or modules may be combined into fewer components and units or modules or further separated into additional components and units or modules.

FIG. 1 is a block diagram of a layout design system according to example embodiments.

Referring to FIG. 1, a layout design system 1 according to example embodiments may include a storage module 10, a generation module 30, and a processor 40.

In detail, the storage module 10 may store a standard cell design 15 and may provide the stored standard cell design 15 to the generation module 20. The storage module 10 may be configured to store a plurality of standard cell designs 15.

Here, the standard cell may be a minimum unit for designing a block, a device or a chip. For example, when the device is a static random access memory (SRAM) device or a logic device, the standard cell may be an inverter cell. However, example embodiments are not limited thereto.

Meanwhile, the standard cell design 15 may include a layout for manufacturing the standard cell. As will later be described in more detail, in example embodiments, the standard cell design 15 may include an active area and a normal gate area disposed on the active area. In addition, the standard cell design 15 may further include a design element, but example embodiments are not limited thereto. Alternatively, the standard cell design 15 may not include a design element. Here, the design element may include an active cut design, which will later be described in more detail.

In FIG. 1, one standard cell design 15 stored in the storage module 10 is described as an example, but example embodiments are not limited thereto. In example embodiments, a plurality of standard cell designs 15 constituting a block, a device or a chip may be stored in the storage module 10. That is to say, the plurality of standard cell designs 15 may be stored in the storage module 10 in the form of a library.

The standard cell design 15 may be used as an input of the generation module 30.

In example embodiments, the storage module 10 may include, for example, a non-volatile memory device, a hard disk drive, a magnetic storage device, and the like, but example embodiments are not limited thereto. Examples of the non-volatile memory device may include a NAND flash, a NOR flash, MRAM, PRAM, RRAM, and so on, but example embodiments are not limited thereto.

The generation module 30 may adjust a width of the active cut design included in the design element using the processor 40 according to a defined chip design requirement 19. In detail, the generation module 30 may generate a marker for adjusting the width of the active cut design. In a case where the active cut design is not included in the standard cell design 15, the generation module 30 may directly generate the active cut design to adjust the width of the active cut design.

Meanwhile, the chip design requirement 19 provided to the generation module 30 may be input by a user. However, example embodiments are not limited thereto. Alternatively, the chip design requirement 19 may be pre-stored in the storage module 10.

In example embodiments, the generation module 30 may be implemented in a software manner, but example embodiments are not limited thereto.

Meanwhile, in example embodiments, in a case where the generation module 30 is implemented in a software manner, the generation module 30 may be stored in the storage module 10 in the form of a code. Alternatively, the generation module 30 may be stored in another storage module (not shown) separated from the storage module 10 in the form of a code.

The processor 40 may be used when the generation module 30 performs a computation. In FIG. 1, only one processor 40 is illustrated, but example embodiments are not limited thereto. In example embodiments, a plurality of processors 40 may be included in the layout design system 1. In other words, the illustrated layout design system 1 may be modified in various manners, such that it can be driven under a multi-core environment. As described above, when the layout design system 1 is driven under the multi-core environment, computation efficiency can be improved.

In example embodiments, the processor 40 may include a hardware processor such as central processing unit (CPU), application specific integrated circuit (ASIC), and/or a suitable hardware processing unit, but example embodiments are not limited thereto. Meanwhile, although not shown in detail, the processor 40 may further include cache memories L1, L2, etc. to improve computation capacity.

In FIG. 1, the layout design system 1, which is configured such that the chip design 50 is generated by providing the standard cell design 15 according to the chip design requirement 19, is illustrated, but example embodiments are not limited thereto. The layout design system 1 may be modified in various manners. For example, in example embodiments, the layout design system 1 may be modified such that a block design (not shown) is generated by providing the standard cell design 15 according to a block design requirement (not shown).

Next, the operation of the layout design system 1 according to example embodiments be described with reference to FIGS. 1 to 5.

Figure 2A:
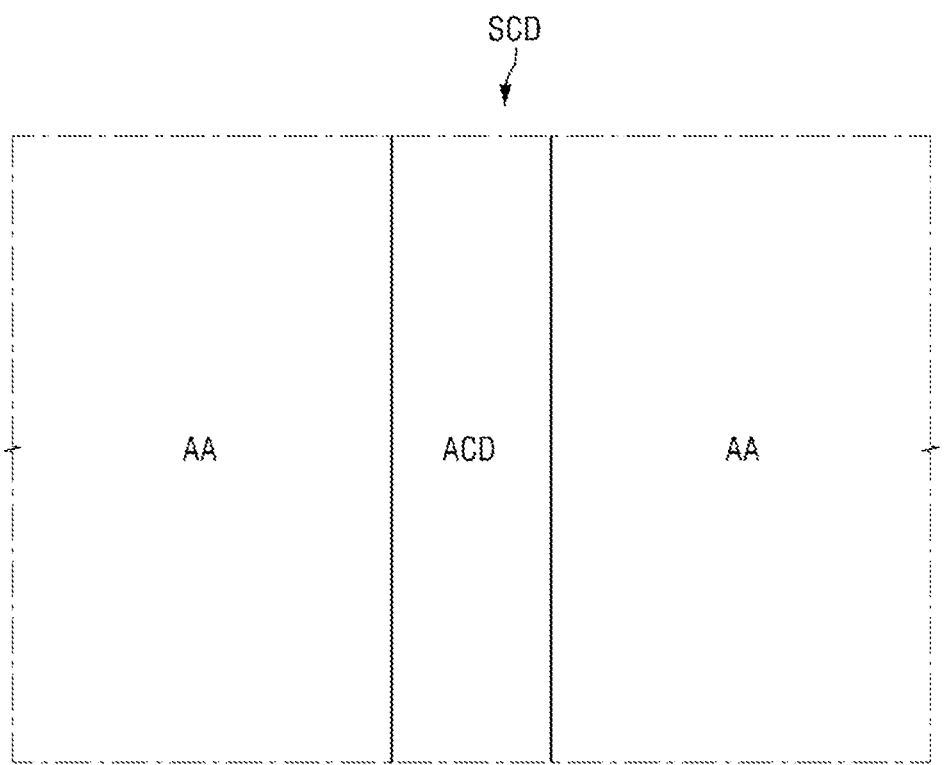
FIGS. 2A and 2B are schematic layout views of a standard cell design and a design element shown in FIG. 1.
Figure 2B:
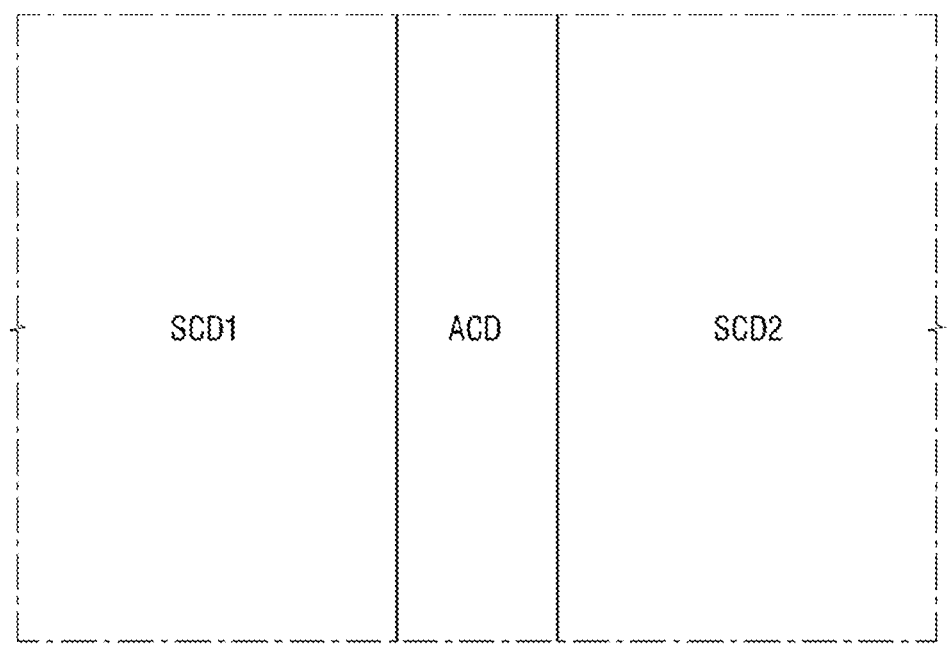
Figure 2B:
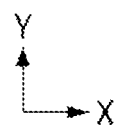
Figure 3:
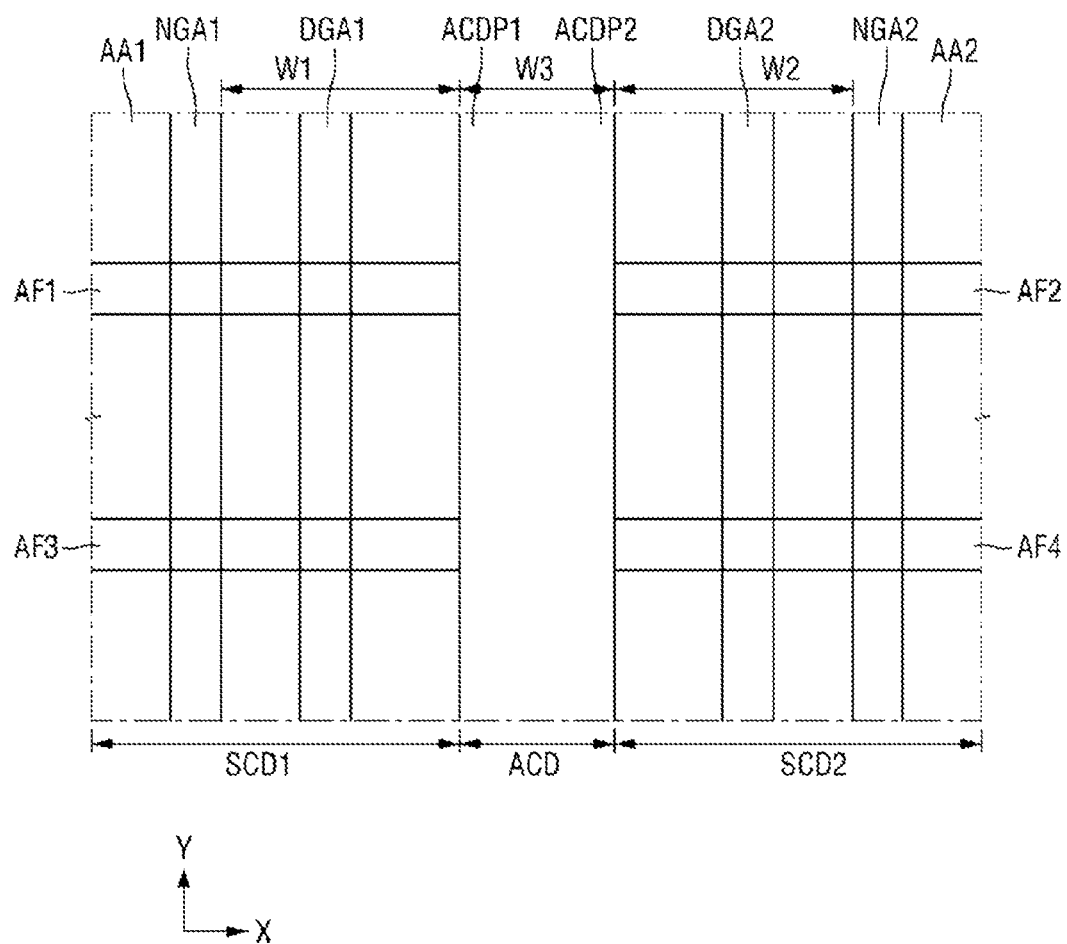
FIG. 3 is a detailed enlarged layout view of FIG. 2.
Figure 4:
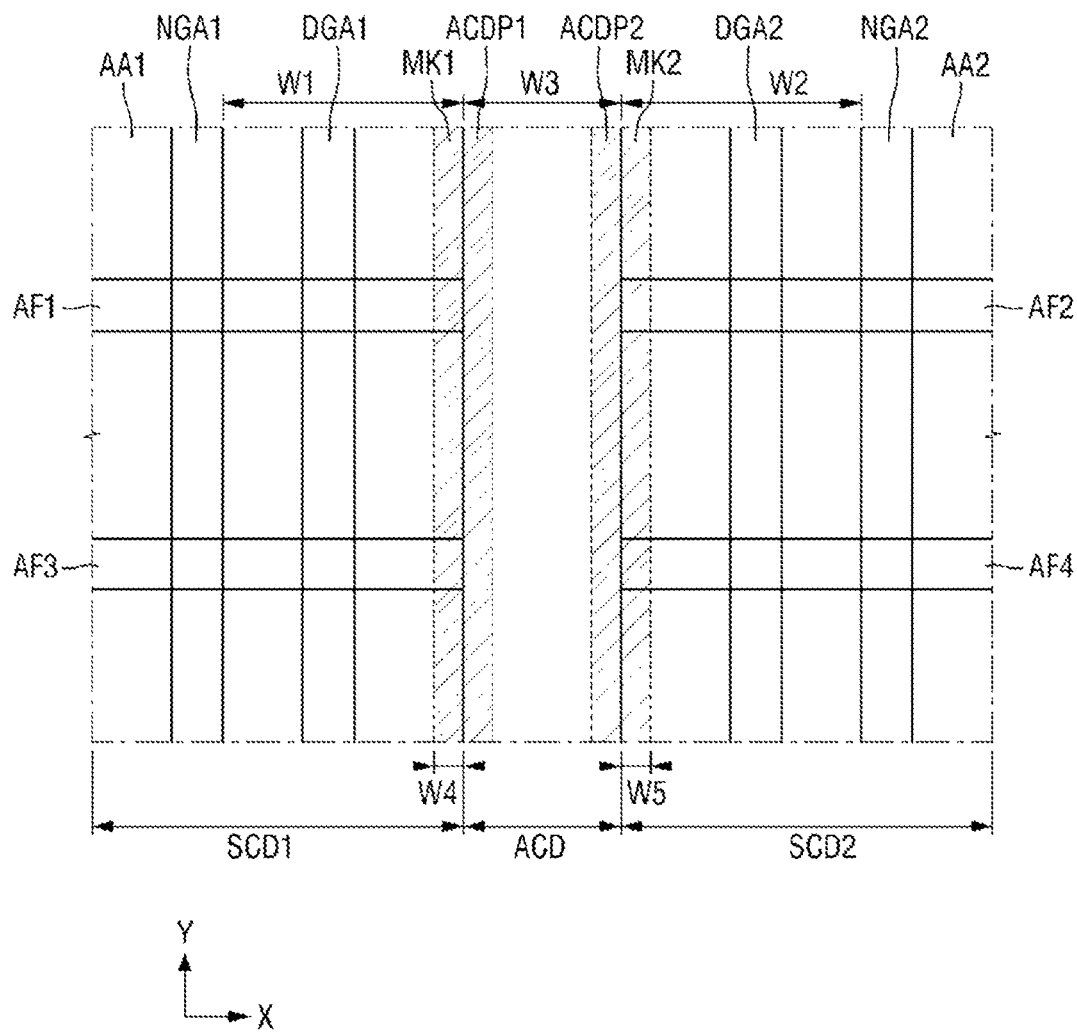
FIGS. 4 and 5 illustrate the operation of a generation module shown in FIG. 1.
Figure 5:
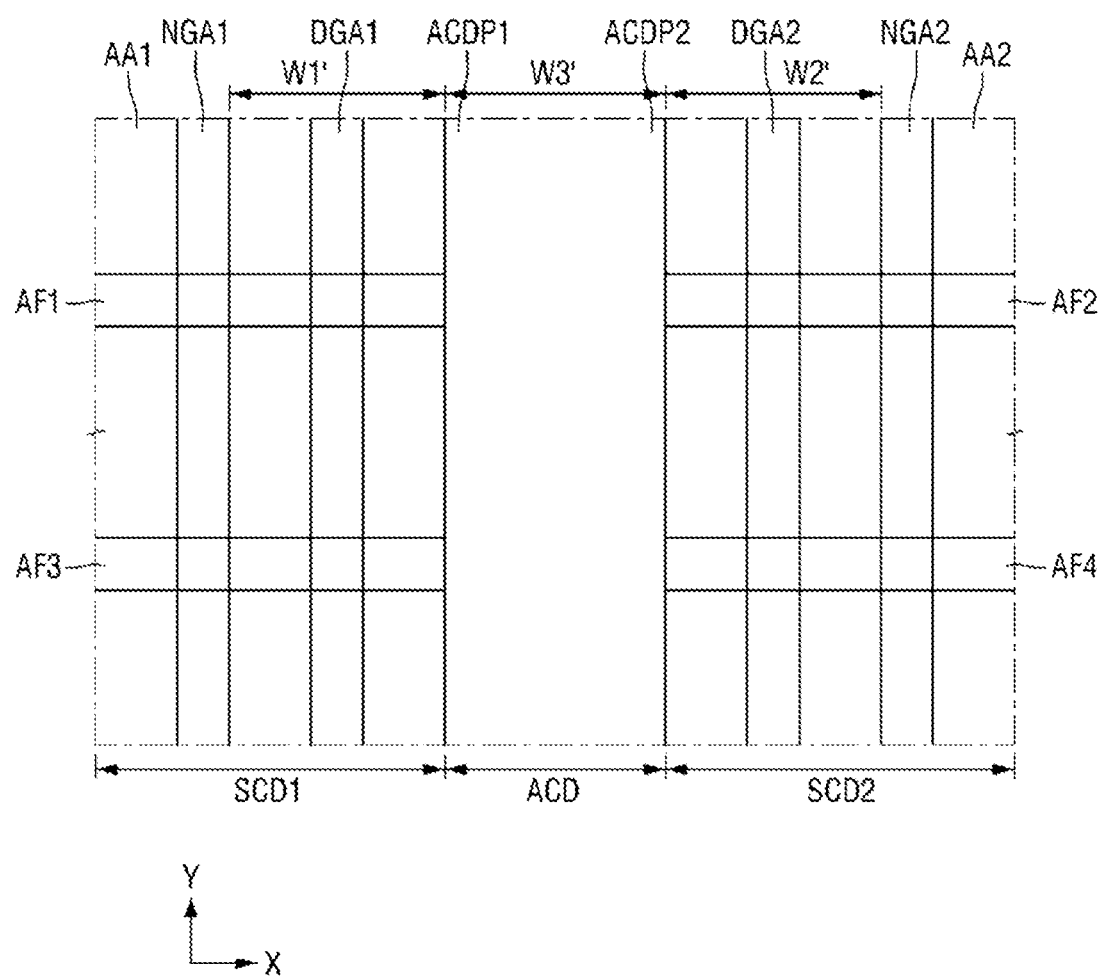

FIGS. 2A and 2B are schematic layout views of a standard cell design and a design element shown in FIG. 1, FIG. 3 is a detailed enlarged layout view of FIG. 2 and FIGS. 4 and 5 illustrate the operation of a generation module shown in FIG. 1.

First, referring to FIG. 1, the storage module 10 may provide the standard cell design 15 to the generation module 30. The standard cell design 15 and the design element will now be described in detail with reference to FIGS. 2A and 2B.

FIG. 2A illustrates a state in which the design element is disposed on the standard cell design SCD. Referring to FIG. 2A, the design element, that is, the active cut design ACD, is disposed on an active area AA of the standard cell design SCD. That is to say, the active cut design ACD is disposed at the center of the active area AA of the standard cell design SCD, so that the active area AA is divided into two sections.

Unlike in FIG. 2A, in FIG. 2B, the design element, that is, the active cut design ACD, is disposed between a plurality of standard cell designs SCD1 and SCD2. FIG. 2B illustrates a case where the plurality of standard cell designs SCD1 and SCD2 share a single design element. That is to say, the active cut design ACD is disposed in a space between the first standard cell design SCD1 and the second standard cell design SCD2, so that the first standard cell design SCD1 and the second standard cell design SCD2 are separated from each other.

As described above, the active cut design ACD shown in FIGS. 2A and 2B may serve to separate the standard cell design (that is, to separate one standard cell design into two, or to separate a plurality of standard cell designs from one another). The design shown in FIG. 2A and the design shown in FIG. 2B may be the same with each other, which will now be described with reference to FIG. 3 together with FIG. 2B.

Referring to FIG. 3, the first standard cell design SCD1 may include a first active area AA1 extending in a first direction X and a first normal gate area NGA1 extending in a second direction Y. In addition, the second standard cell design SCD2 may include a second active area AA2 extending in the first direction X and a second normal gate area NGA2 extending in the second direction Y.

A gap in the first direction X between the first normal gate area NGA1 and a first part ACDP1 of the active cut design ACD may have a first width W1, and a gap in the first direction X between the second normal gate area NGA2 and a second part ACDP2 of the active cut design ACD may have a second width W2. The first width W1 and the second width W2 may be equal to each other. Alternatively, the first width W1 and the second width W2 may be different from each other. For example, the first width W1 may be less than the second width W2, or the first width W1 may be greater than the second width W2. In addition, the first part ACDP1 of the active cut design ACD may include one end of the active cut design ACD facing the first active area AA1, the second part ACDP2 may include the other end of the active cut design ACD facing the second active area AA2, and the first part ACDP1 and the second part ACDP2 may be spaced apart from each other in the first direction X.

In addition, the first standard cell design SCD1 may further include first and third active fins AF1 and AF3 extending in the first direction X and a first dummy gate area DGA1 spaced apart from the first normal gate area NGA1 in the first direction X, and the second standard cell design SCD2 may further include second and fourth active fins AF2 and AF4 second and fourth active fins AF2 and AF4 extending in the first direction X and a second dummy gate area DGA2 spaced apart from the spaced apart from the second normal gate area NGA1 in the first direction X.

Here, the first dummy gate area DGA1 may be disposed between the first normal gate area NGA1 and the first part ACDP1 of the active cut design ACD, and the second dummy gate area DGA2 may be disposed between the second normal gate area NGA2 and the second part ACDP2 of the active cut design ACD. In addition, in the first direction X, the first active fin AF1 and the second active fin AF2 may be positioned on the same line and the third active fin AF3 and the fourth active fin AF4 may be positioned on the same line. Here, a gap between the first active fin AF1 and the second active fin AF2 and a gap between the third active fin AF3 and the fourth active fin AF4 may be equal to a third width W3 of the first direction X of the active cut design ACD. Here, the meaning 'being equal' used herein may include not only 'being completely the same' but 'encompassing a process error' that may be generated during a fabrication process.

Referring to FIGS. 1 and 4, the generation module 30 may generate a first marker MK1 adjusting a width in the first direction X of the first part ACDP1 of the active cut design ACD and a second marker MK2 adjusting a width in the first direction X of the second part ACDP2. In more detail, the first marker MK1 is generated on a boundary between the first active area AA1 and the first part ACDP1 of the active cut design ACD so as to overlap with the first active area AA1 and the first part ACDP1 of the active cut design ACD and the second marker MK2 is generated on a boundary between the second active area AA2 and the second part ACDP2 of the active cut design ACD so as to overlap with the second active area AA2 and the second part ACDP2 of the active cut design ACD.

Here, a width in the first direction X, on which the first marker MK1 and the first active area AA1 overlap with each other, may be a fourth width W4, and a width in the first direction X, on which the second marker MK2 and the second active area AA2 overlap with each other, may be a fifth width W5. The fourth width W4 and the fifth width W5 may be equal to each other, but example embodiments are not limited thereto. That is to say, the fourth width W4 and the fifth width W5 may be different from each other.

In addition, the first marker MK1 may be generated so as not to overlap with the first dummy gate area DGA1, and the second marker MK2 may be generated so as not to overlap with the second dummy gate area DGA2, but example embodiments are not limited thereto.

Referring to FIG. 5, the width in the first direction X of the active cut design ACD may be extended to have a width (e.g., third width bar W3') equal to a sum of the third width W3, the fourth width W4 and the fifth width W5. As the width in the first direction X of the active cut design ACD is extended to the third width bar W3', the first width W1 may be reduced to a first width bar W1', and the second width W2 may be reduced to a second width bar W2'.

Even though FIGS. 4-5 illustrate a case where the width of the active cut design ACD is extended from W3 to W3', where the third width bar W3' is wider than the width W3, example embodiments are not limited thereto. Alternatively, although not illustrated, the width of the active cut design ACD may be reduced so the third width bar W3' is less than the W3. For example, the generation module 30 may alternatively adjust the width W3 of the active cut design ACD in the first direction X so the width of the third width bar W3' equals the third width W3 minus the fourth width W4 and the fifth width W5. In other words, the generation module 30 may use the first marker MK1 to extend the active fins AF1 and AF3 in the first direction X by the fourth width W4 and to use the second marker MK2 to extend the active fins AF2 and AF4 in the first direction by the fifth width W5; consequently, a gap between the active fins AF1 and AF3 to active fins AF2 and AF4 may be reduced by a sum of the fourth width W4 and the fifth width W5.

In the layout design system 1 according to example embodiments, since only the width of the active cut design ACD is changed without changing the width or length of a gate area, a library set (for example, the chip design 50) can be rapidly implemented just by a minor change. In addition, even if various parameters (for example, a gap between the normal gate area NGA and the active cut design ACD or a gap between the first active area AA1 and the second active area AA2) becomes different from initially set values, only the width of the active cut design ACD is changed without changing the entire design, thereby rapidly implementing a library set having optimum performance.

If the parameters are changed, the resistance and capacitance of a transistor may vary, thereby varying performance-related parameters, including power, delay, or leakage, as well. That is to say, according to example embodiments, a width of the active cut design ACD corresponding to a case where the optimum performance is demonstrated can be selected through a simulation depending on the change in the width of the active cut design ACD. In addition, the thus-designed chip design 50 can be used in manufacturing a semiconductor device. Therefore, in example embodiments, the layout design system 1 may be used to generate a layout design with secured reliability of a product.

Although FIGS. 3-5 illustrate the first standard cell design SCD1 includes the two active fins AF1 and AF3 spaced apart from each other in the second direction Y and crossing the first normal gate area NGA1 and the first dummy gate area DGA1, example embodiments are not limited thereto. For example, the first standard cell design SCD1 may include more than two active fins spaced apart from each other in the second direction Y and crossing the first normal gate area NGA1 and the first dummy gate area DGA1. Similarly, the second standard cell design SCD2 may include more than two active fins (e.g., AF2 and AF4) spaced apart from each other in the second direction Y and crossing the second normal gate area NGA2 and the second dummy gate area DGA2.

Hereinafter, a layout design system according to example embodiments will be described with reference to FIGS. 6 and 7.

Figure 6:
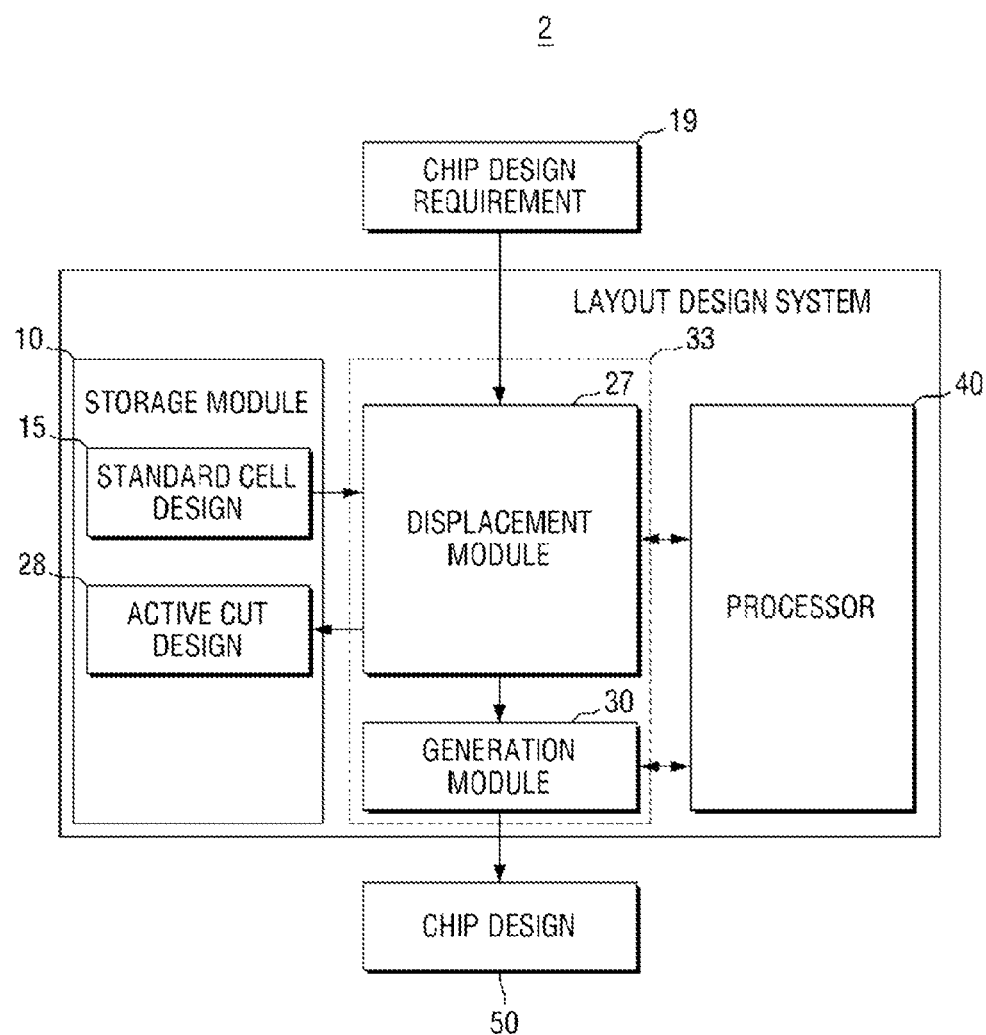
FIG. 6 is a block diagram of a layout design system according to example embodiments.
Figure 7:
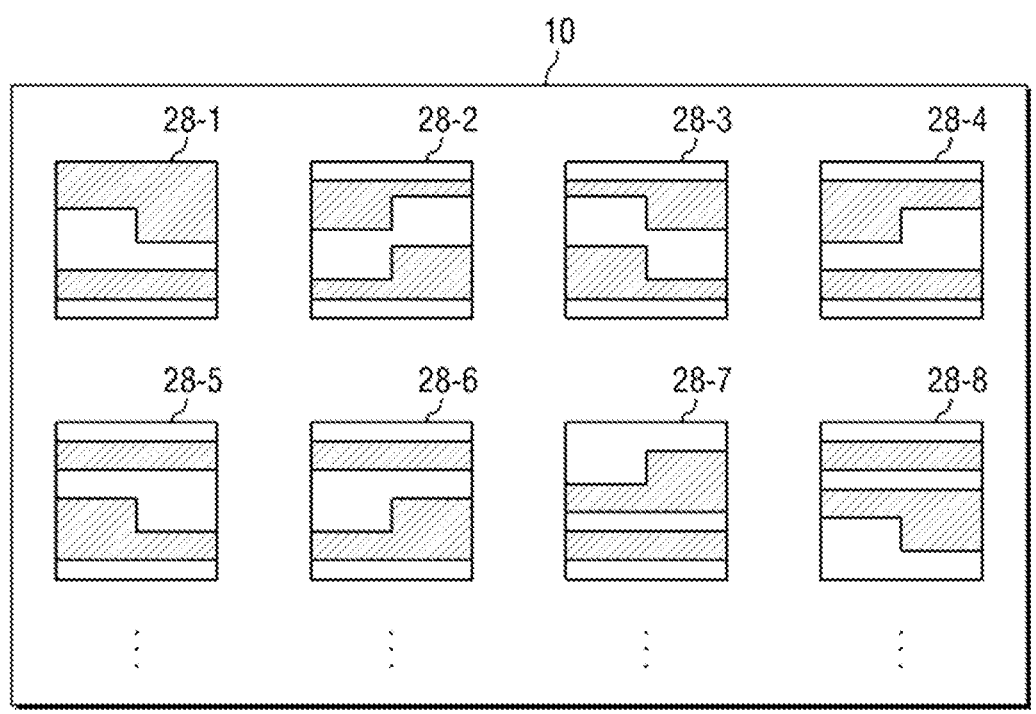
FIG. 7 illustrates a candidate active cut design shown in FIG. 6.

FIG. 6 is a block diagram of a layout design system according to example embodiments and FIG. 7 illustrates a candidate active cut design shown in FIG. 6.

The following description will focus on differences between FIGS. 1-5 and 6-7. Repeated descriptions will be omitted.

Referring to FIGS. 6 and 7, in the layout design system 2 according to example embodiments, a plurality of candidate active cut designs 28 may be stored in a storage module 10.

In detail, as shown in FIG. 7, first to eighth active cut designs 28-1 to 28-8 having different shapes may be stored in the storage module 10.

Meanwhile, a displacement module 27 may place a standard cell design 15 according to a defined requirement 19 using a processor 40. The displacement module 27 may select one among the plurality of candidate active cut designs 28 stored in the storage module 10 and may place the selected candidate active cut design 28 on the standard cell design 15 or on a plurality of standard cell designs 15.

In addition, the displacement module 27 may be implemented in a software manner, but example embodiments are not limited thereto.

A generation module 30 may adjust a width of an active cut design according to the defined requirement 19 using the processor 40. That is to say, the generation module 30 may generate a marker to adjust the width of the active cut design.

Meanwhile, in example embodiments, when both of the displacement module 27 and the generation module 30 are implemented in a software manner, each of the displacement module 27 and the generation module 30 may be stored in the storage module 10 in the form of a code. Alternatively, each of the displacement module 27 and the generation module 30 may be stored in another storage module (not shown) separated from the storage module 10 in the form of a code.

In addition, in the layout design system 2, the displacement module 27 and the generation module 30 may be implemented by an integrated module 33. Accordingly, an output of the displacement module 27 may be supplied to the generation module 30 as an input of the generation module 30, and the generation module 30 may receive the input to generate a chip design 50. The displacement module 27 and the generation module 30 may be implemented by the integrated module 33, but example embodiments are not limited thereto. The displacement module 27 and the generation module 30 may be implemented by separate and different modules.

Hereinafter, a semiconductor device using layout design systems according to example embodiments will be described with reference to FIGS. 8 to 10.

Figure 8:
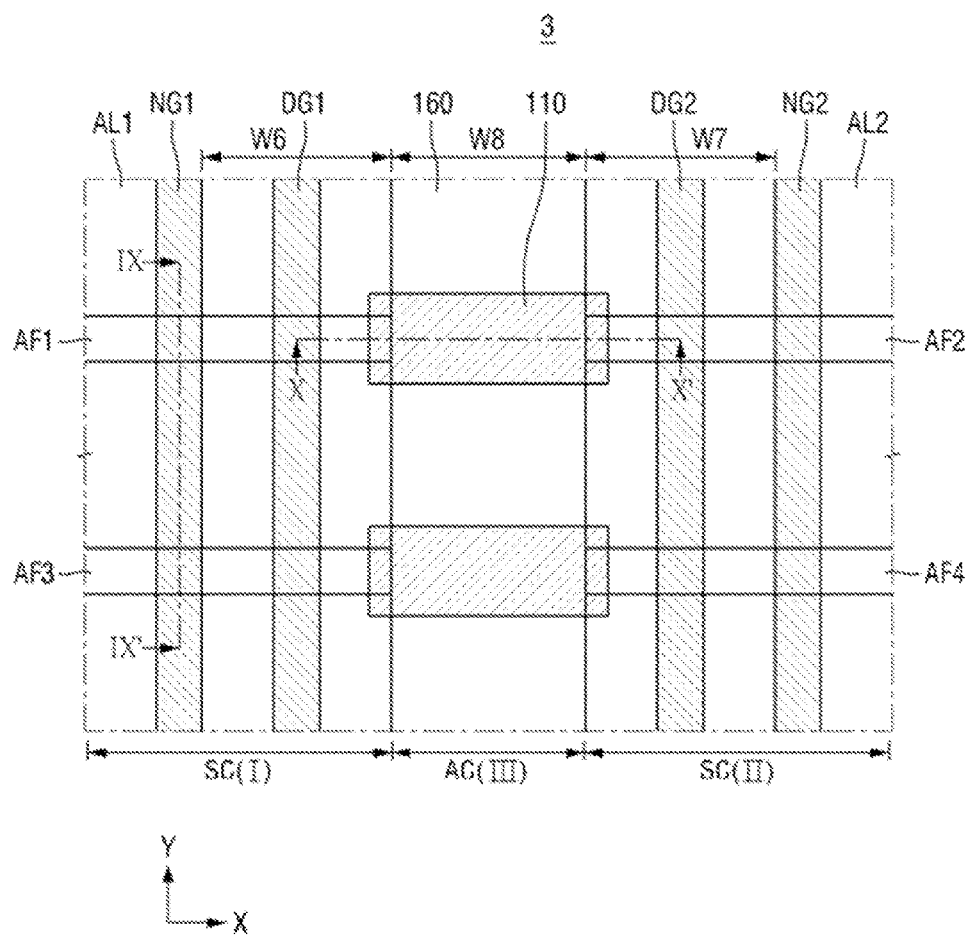
FIG. 8 is a layout view of a semiconductor device using layout design systems according to example embodiments.
Figure 9:
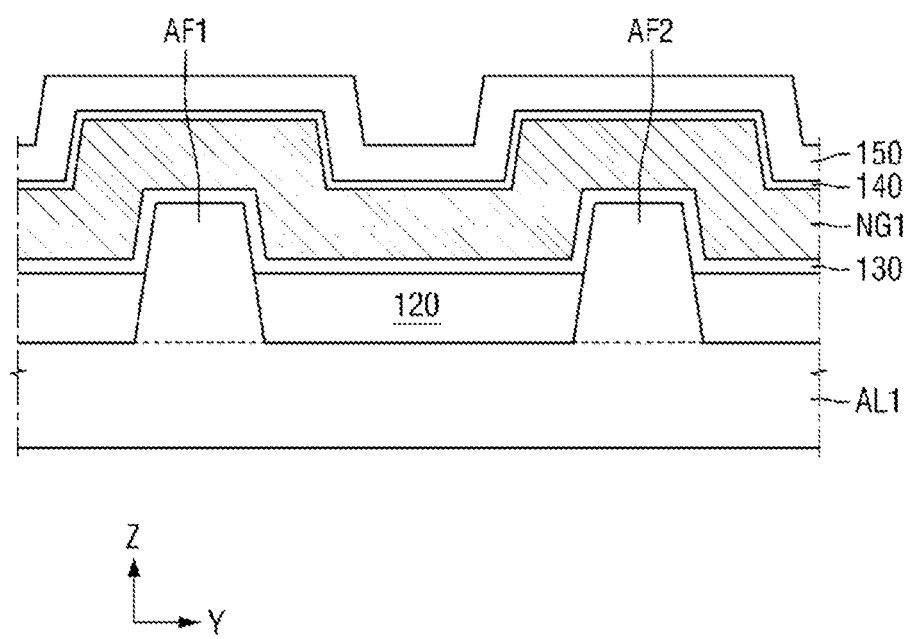
FIG. 9 is a cross-sectional view taken along the line IX-IX' of FIG. 8.
Figure 10:
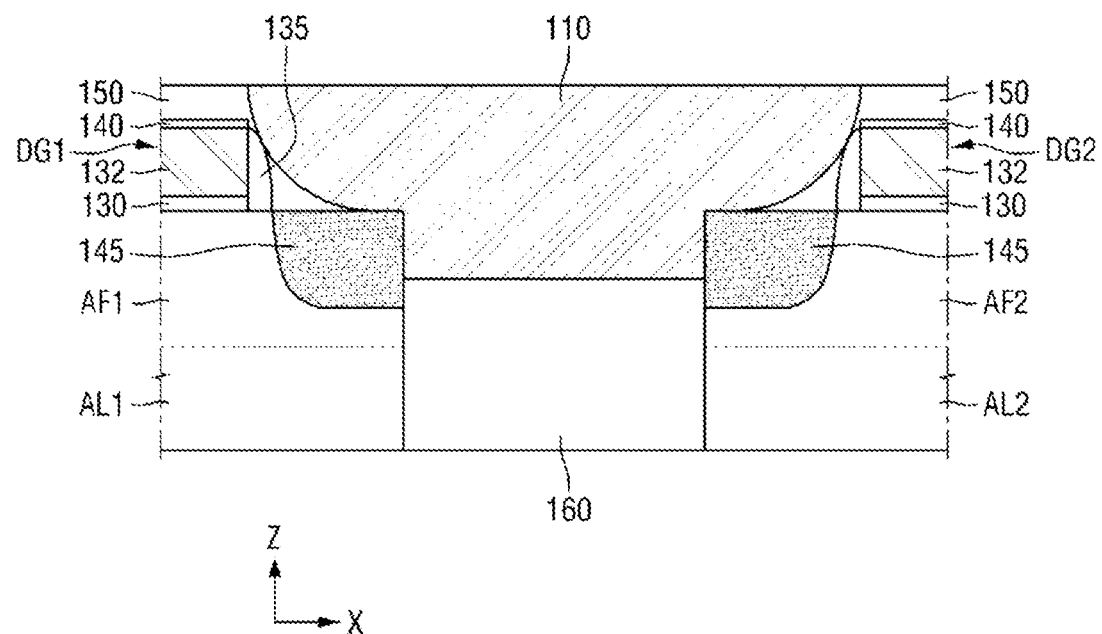
FIG. 10 is a cross-sectional view taken along the line X-X' of FIG. 8.

FIG. 8 is a layout view of a semiconductor device using layout design systems according to example embodiments, FIG. 9 is a cross-sectional view taken along the line IX-IX' of FIG. 8 and FIG. 10 is a cross-sectional view taken along the line X-X' of FIG. 8. In the following description, for brevity, a semiconductor device manufactured based on the layout design shown in FIG. 5 will be described by way of example.

Referring to FIGS. 8 to 10, the semiconductor device 3 may include first to third regions I to III.

The first region I may be a region where the first standard cell SC1 manufactured by the first standard cell design SCD1 shown in FIG. 5 is formed, the second region II may be a region where the second standard cell SC2 manufactured by the second standard cell design SCD2 shown in FIG. 5 is formed, and the third region III may be a region where the active cut AC manufactured by the active cut design ACD shown in FIG. 5 is formed.

The semiconductor device 3 may include active layers AL1 and AL2, active fins AF1 to AF4, a self-aligned contact 110, a gate insulation layer 130, a spacer 135, a capping layer 140, a source/drain 145, an interlayer insulation layer 150, an isolation layer 160, normal gates NG1 and NG2, and dummy gates DG1 and DG2.

The active layers AL1 and AL2 may be, for example, semiconductor substrates. The active layers AL1 and AL2 may include one or more semiconductor materials selected from the group consisting of Si, Ge, SiGe, GaP, GaAs, SiC, SiGeC, InAs and InP, but example embodiments are not limited thereto.

Meanwhile, in example embodiments, insulating substrates may be used as the active layers AL1 and AL2. For example, SOI (Silicon On Insulator) substrates may be used as the active layers AL1 and AL2. Here, the active fins AF1 to AF4 may be formed by forming single crystalline silicon on buried oxide layers used as the active layers AL1 and AL2 and patterning the single crystalline silicon. In this case, the active fins AF1 to AF4 may be epitaxial layers. In such a manner, in a case of using the SOI substrate, a delay time can be advantageously reduced during operation of the semiconductor device 3.

In addition, the active layers AL1 and AL2 may extend in the first direction X. The active layers AL1 and AL2 may be formed on the active areas AA1 and AA2 of the chip design shown in FIG. 5, respectively. That is to say, the active layers AL1 and AL2 and the active areas AA1 and AA2 of the chip design shown in FIG. 5 may have substantially the same shape. The active fins AF1 to AF4 may be formed on the active layers AL1 and AL2. Although FIG. 8 illustrates the active layers AL1 and AL2 spaced apart from each other in the first direction X, example embodiments are not limited thereto. For example, the active layers AL1 and AL2 may be interconnected to each other without being separated from each other, unlike the active areas AA1 and AA2 of the chip design shown in FIG. 5.

As shown in FIGS. 8-10, the active fins AF1 to AF4 may extend in the first direction X to be formed on the active layers AL1 and AL2. Here, the active fins AF1 to AF4 may be isolated from each other by a shallow trench isolation (STI) 120, as shown in FIG. 9.

In example embodiments, as shown in FIGS. 8-10, the active fins AF1 to AF4 may be formed by grouping each two of the active fins AF1 to AF4. That is to say, two active fins (e.g., AF1 and AF3) may be formed on one active layer (e.g., AL1). The active fins AF1 and AF3 may have the above-described shapes because they are formed by etching the active layer AL1 using two dummy spacers, but example embodiments are not limited thereto. The arrangement shapes of the active fins AF1 to AF4 may be modified in various manners.

In FIGS. 8-10, sections of the active fins AF1 to AF4 are upwardly tapered, such that widths of the sections thereof downwardly increase, but example embodiments are not limited thereto. In example embodiments, the active fins AF1 to AF4 active fins AF1 to AF4 may have rectangular sections. In example embodiments, sections of the active fins AF1 to AF4 may be chamfered. For example, the active fins AF1 to AF4 may have rounded corners.

Meanwhile, FIGS. 8-10, a self-aligned contact 110 may be positioned between the active fins (e.g., AF1 and AF2) spaced an eighth width W8 apart from each other in the first direction X to electrically connect the active fins AF1 and AF2 to each other. The self-aligned contact 110 may be formed using a capping layer 140 formed on a gate electrode (e.g., 132), but example embodiments are not limited thereto. The forming of the self-aligned contact 110 may be skipped.

A gate insulation layer 130 extending in a second direction Y may be formed on the active fins AF1 to AF4. The gate insulation layer 130 may include a dielectric material. For example, the gate insulation material may include a high-k material (e.g., a material having a higher dielectric constant than $SiO_2$). For example, the gate insulation layer 130 may include a material selected from the group consisting of $HfO_2$, $Al_2O_3$, $ZrO_2$, and $TaO_2$, but example embodiments are not limited thereto.

Although not shown in detail, an interface layer may be formed between the gate insulation layer 130 and the active fins AF to reduce and/or prevent a failed interface between the gate insulation layer 130 and the active fins AF. The interface layer may include a low-k material layer having a dielectric constant (k) of 9 or less, for example, silicon oxide (k≈4), or silicon oxynitride (k≈4~8 according to the concentrations of oxygen and nitrogen atoms). Alternatively, the interface layer may include silicate, or combinations of the layers listed above.

In addition, unlike in FIG. 10, the gate insulation layer 130 may be configured to upwardly extend along sidewalls of the spacer 140, which is because the semiconductor device 3 is manufactured using a gate last process.

In addition, although not shown in detail, a work function control film (not shown) may be formed on the gate insulation layer 130. The work function control film may be used in controlling a work function of a transistor TR formed at an intersection of an active fin AF and a normal gate NG. The work function control film may be a single layer made of a metal, or may have a multi-layered structure including a metal nitride layer and a metal layer. Examples of the metal forming the work function control film may include Al, W, Ti, or a combination thereof, and examples of the metal nitride layer may include TiN, TaN, or a combination thereof, but example embodiments are not limited thereto.

A normal gate NG and a dummy gate DG extending in the second direction Y may be formed on the gate insulation layer 130. In the illustrated embodiment, the normal gate NG may be formed on a normal gate area NGA of a chip design shown in FIG. 5. The dummy gate DG may be formed on a dummy gate area DGA of the chip design shown in FIG. 5. Therefore, the normal gate NG and the normal gate area NGA of a chip design shown in FIG. 5 may have substantially the same shape. In addition, the dummy gate DG and the dummy gate area DGA of the chip design shown in FIG. 5 may have substantially the same shape.

The normal gate NG and the dummy gate DG may include conductive materials. In example embodiments, the normal gate NG and the dummy gate DG may include highly conductive metals, but example embodiments are not limited thereto. For example, the normal gate NG and the dummy gate DG may include a non-metal, such as polysilicon.

The spacer 135 may be positioned on at least one side of the normal gate NG and the dummy gate DG. In detail, as shown in FIG. 10, the spacer 135 may be positioned on both sides of the dummy gate DG. The spacer 135 may include at least one of a nitride layer and an oxynitride layer. In FIG. 10, one side surface of the spacer 135 is curved, but example embodiments are not limited thereto. The shape of the spacer 135 may be modified in various manners. For example, unlike in FIG. 10, the spacer 135 may have a modified shape, such as an M-letter shape or an L-letter shape. In addition, while only the dummy gate DG is illustrated in FIG. 10, the spacer 135 may be positioned on both sides of the normal gate NG.

A source/drain region 145 may be formed in the active fin AF positioned on both sides of the normal gate NG and the dummy gate DG. In FIG. 10, the source/drain region 145 formed in the active fin AF is illustrated, but example embodiments are not limited thereto. For example, the source/drain region 145 may be formed as an epitaxial layer in a trench in the active fin AF.

For brevity, in FIG. 10, only a portion of the interlayer insulation layer 150 is illustrated, the interlayer insulation layer 150 may be formed to cover the source/drain region 145, the normal gate NG and the dummy gate DG.

The isolation layer 160 may cover side surfaces of the active fin AF. In detail, as shown in FIGS. 8 and 10, the isolation layer 160 may cover a bottom surface of the active fin AF and side surfaces of an active layer AL. The isolation layer 160 may be an insulation layer. For example, the isolation layer 160 may include at least one of silicon oxide (SiO$_2$), silicon nitride (SiN), and silicon oxynitride (SiON), but example embodiments are not limited thereto. In addition, in FIG. 10, the isolation layer 160 covering the side surfaces of the active layer AL is illustrated, but example embodiments are not limited thereto. For example, the isolation layer 160 may be formed to cover only the bottom surface of the active fin AF (for example, unlike in FIG. 10, the active layer AL may not be etched).

Next, a memory device including the semiconductor device shown in FIG. 8 will be described with reference to FIGS. 11 to 13.

Figure 11:
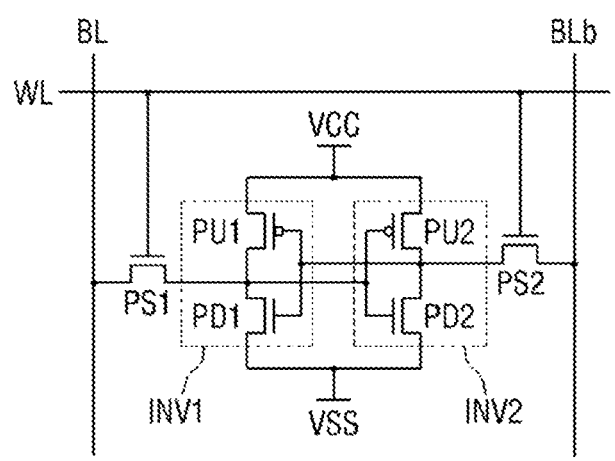
FIG. 11 illustrates a circuit view of a memory device including the semiconductor device shown in FIG. 8.
Figure 12:
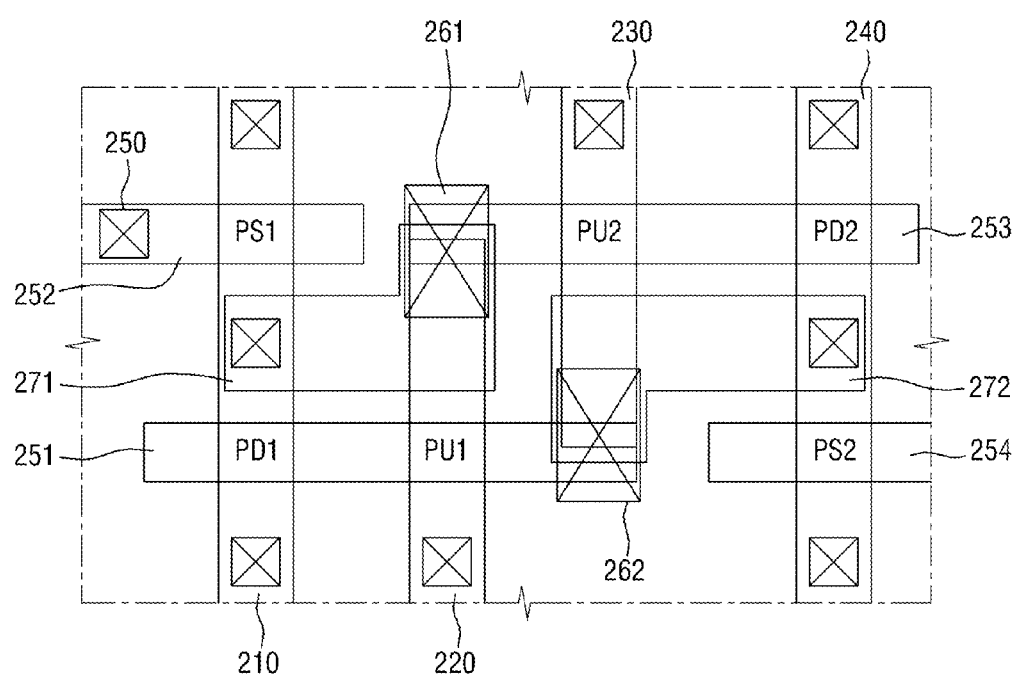
FIG. 12 is a layout view of the memory device shown in FIG. 11.
Figure 13:
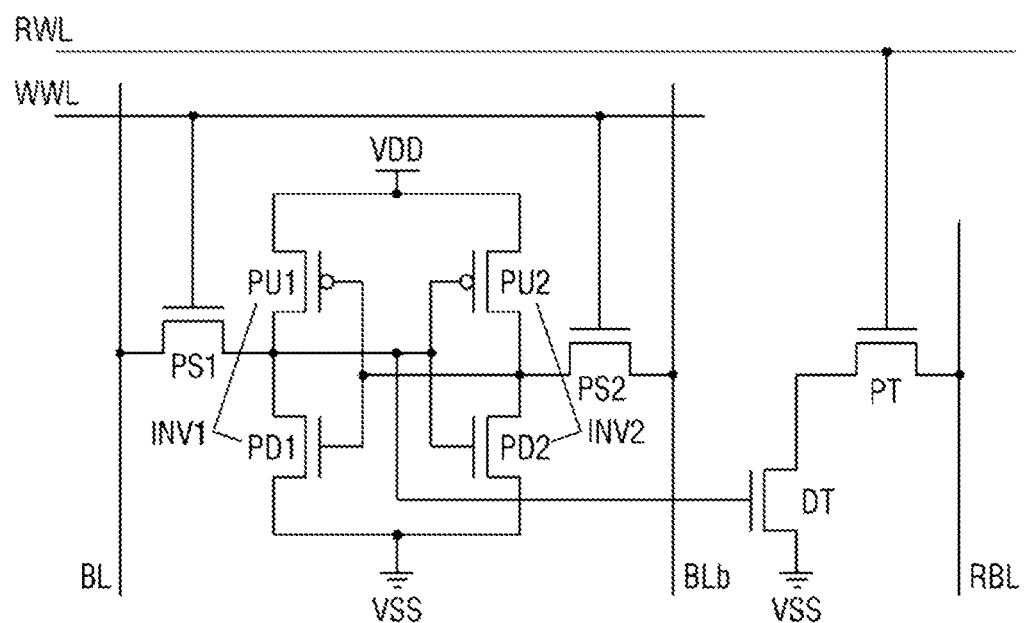
FIG. 13 illustrates a circuit view of a memory device including the semiconductor device shown in FIG. 8.

FIG. 11 illustrates a circuit view of a memory device including the semiconductor device shown in FIG. 8, FIG. 12 is a layout view of the memory device shown in FIG. 11 and FIG. 13 illustrates a circuit view of a memory device including the semiconductor device shown in FIG. 8.

In the following description, the memory device will be described with regard to a static random access memory (SRAM) by way of example, but example embodiments are not limited thereto.

Referring to FIG. 11, according to example embodiments, a memory device 81a may include a pair of inverters INV1 and INV2 connected in parallel between a power supply node VCC and a ground node VSS and a first select transistor PS1 and a second select transistor PS2 connected to output nodes of the respective inverters INV1 and INV2. The first select transistor PS1 and the second select transistor PS2 may be connected to a bit line BL and a complementary bit line BLb, respectively. Gates of the first select transistor PS1 and the second select transistor PS2 may be connected to word lines WL.

The first inverter INV1 may include a first pull-up transistor PU1 and a first pull-down transistor PD1 connected in series, and the second inverter INV2 may include a second pull-up transistor PU2 and a second pull-down transistor PD2 connected in series. The first pull-up transistor PU1 and the second pull-up transistor PU2 may be PFET transistors, and the first pull-down transistor PD1 and the second pull-down transistor PD2 may be NFET transistors.

In addition, in order to constitute a latch circuit, the first inverter INV1 and the second inverter INV2 may be configured such that an input node of the first inverter INV1 is connected to the output node of the second inverter INV2, and an input node of the second inverter INV2 is connected to the output node of the first inverter INV1.

Referring further to FIG. 12, a first active fin 210, a second active fin 220, a third active fin 230, and a fourth active fin 240, which are spaced apart from one another, are formed to extend lengthwise in a direction (for example, in the first direction X shown in FIG. 8). The second active fin 220 and the third active fin 230 may extend in shorter lengths than the first active fin 210 and the fourth active fin 240.

In addition, the first gate electrode 251, the second gate electrode 252, the third gate electrode 253, and the fourth gate electrode 254 may extend lengthwise in the other direction (for example, in the second direction Y shown in FIG. 8) so as to cross the first active fin 210 to the fourth active fin 240.

In detail, the first gate electrode 251 may completely cross the first active fin 210 and the second active fin 220 and may partially overlap with a terminal end of the third active fin 230. The third gate electrode 253 may completely cross the fourth active fin 240 and the third active fin 230 and may partially overlap with a terminal end of the second active fin 220. The second gate electrode 252 and the fourth gate electrode 254 are formed to cross the first active fin 210 and the fourth active fin 240, respectively.

The first pull-up transistor PU1 may be defined around a region where the first gate electrode 251 and the second active fin 220 cross each other, the first pull-down transistor PD1 may be defined around a region where the first gate electrode 251 and the first active fin 210 cross each other, and the first select transistor PSI may be defined around a region where the second gate electrode 252 and the first active fin 210 cross each other. The second pull-up transistor PU2 may be defined around a region where the third gate electrode 253 and the third active fin 230 cross each other, the second pull-down transistor PD2 may be defined around a region where the third gate electrode 253 and the fourth active fin 240 cross each other, and the second select transistor PS2 may be defined around a region where the fourth gate electrode 254 and the fourth active fin 240 cross each other.

Although not shown, sources/drains may be formed at opposite sides of the regions where the first to fourth gate electrodes 251 to 254 and the first to fourth active fins 210, 220, 230 and 240 cross each other, and a plurality of contacts 250 may be formed.

In addition, a first shared contact 261 concurrently connects the second active fin 220, the third gate line 253 and a wire 271. A second shared contact 262 concurrently connects the third active fin 230, the first gate line 251 and a wire 272.

Here, the first to fourth gate electrodes 251 to 254 and the first to fourth active fins 210, 220, 230 and 240 may be generated by designs using the layout design systems 1 and 2 according to example embodiments.

In the foregoing description, the memory device 81a has been described with regard to a 6T SRAM having 6 transistors, but example embodiments are not limited thereto.

Hereinafter, a memory device including a semiconductor device according to example embodiments will be described with reference to FIG. 13.

Referring to FIG. 13, according to example embodiments, a memory device.

Referring to FIG. 13, a memory device 81b may include a pair of inverters INV1 and INV2 connected in parallel between a power supply node VDD and a ground node VSS, a first pass transistor PS1 and a second pass transistor PS2 connected to output nodes of the respective inverters INV1 and INV2, a drive transistor DT controlled by the output of the first inverter INV1, and a pass transistor PT connected to an output node of the drive transistor DT. The memory device 81b may be an 8T SRAM including 8 transistors.

The first select transistor PS1 and the second select transistor PS2 may be connected to a bit line BL and a complementary bit line BLb, respectively. Gates of the first select transistor PS1 and the second select transistor PS2 may be connected to write word lines WWL.

The first inverter INV1 may include a first pull-up transistor PU1 and a first pull-down transistor PD1 connected in series, and the second inverter INV2 may include a second pull-up transistor PU2 and a second pull-down transistor PD2 connected in series. The first pull-up transistor PU1 and the second pull-up transistor PU2 may be PFET transistors, and the first pull-down transistor PD1 and the second pull-down transistor PD2 may be NFET transistors.

In addition, in order to constitute a latch circuit, the first inverter INV1 and the second inverter INV2 may be configured such that an input node of the first inverter INV1 is connected to the output node of the second inverter INV2, and an input node of the second inverter INV2 is connected to the output node of the first inverter INV1.

The drive transistor DT and the pass transistor PT may be used in reading data stored in the latch circuit constituted by the first inverter INV1 and the second inverter INV2. A gate of the drive transistor DT may be connected to the output node of the first inverter INV1 and a gate of the pass transistor PT may be connected to a read word line RWL. As shown, the output of the drive transistor DT may be connected to the ground node VSS and the output of the pass transistor PT may be connected to a read bit line RBL.

With this configuration, the memory device according to example embodiments may access data stored in SRAM may through two ports (for example, double ports). First, the write word line WWL, the bit line BL and the complementary bit line BLb are selected, thereby writing data to the latch circuit constituted by the first inverter INV1 and the second inverter INV2 or reading data stored in the latch circuit. That is to say, this route of the latch circuit may be used as the first port. Alternatively, the read word line RWL and a read bit line RBL are selected, thereby reading data stored in the latch circuit constituted by the first inverter INV1 and the second inverter INV2. That is to say, this route of the latch circuit may be used as the second port.

In the aforementioned SRAM, the reading of data based on the second port and the reading of data based on the first port are performed independently, so that the data stored in the latch circuit may not be affected by the operation of reading data based on the first or second port. In other words, the reading of the data stored in the latch circuit and the writing of the data stored in the latch circuit may be independently performed.

Next, a system on chip (SoC) system including semiconductor devices according to example embodiments will be described with reference to FIGS. 14 to 16.

Figure 14:
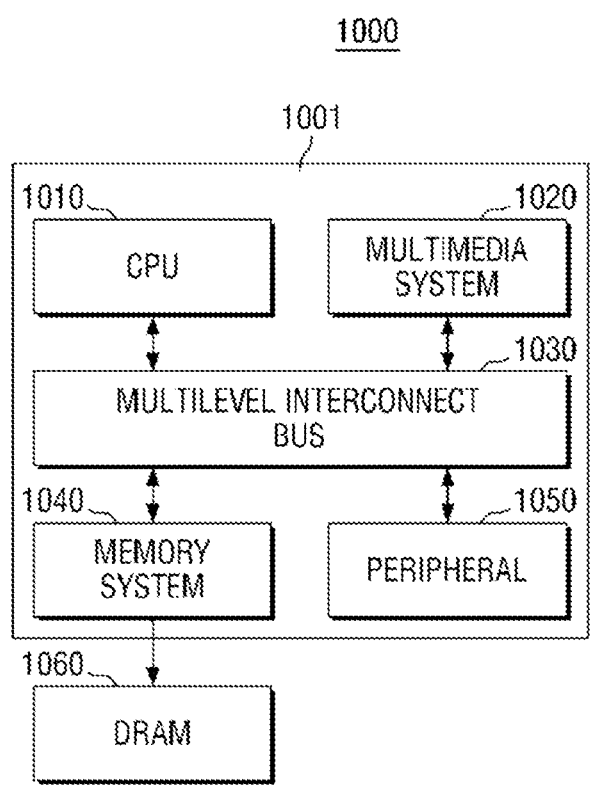
FIG. 14 is a block diagram of a system on chip (SoC) system including the semiconductor device shown in FIG. 8.
Figure 15:
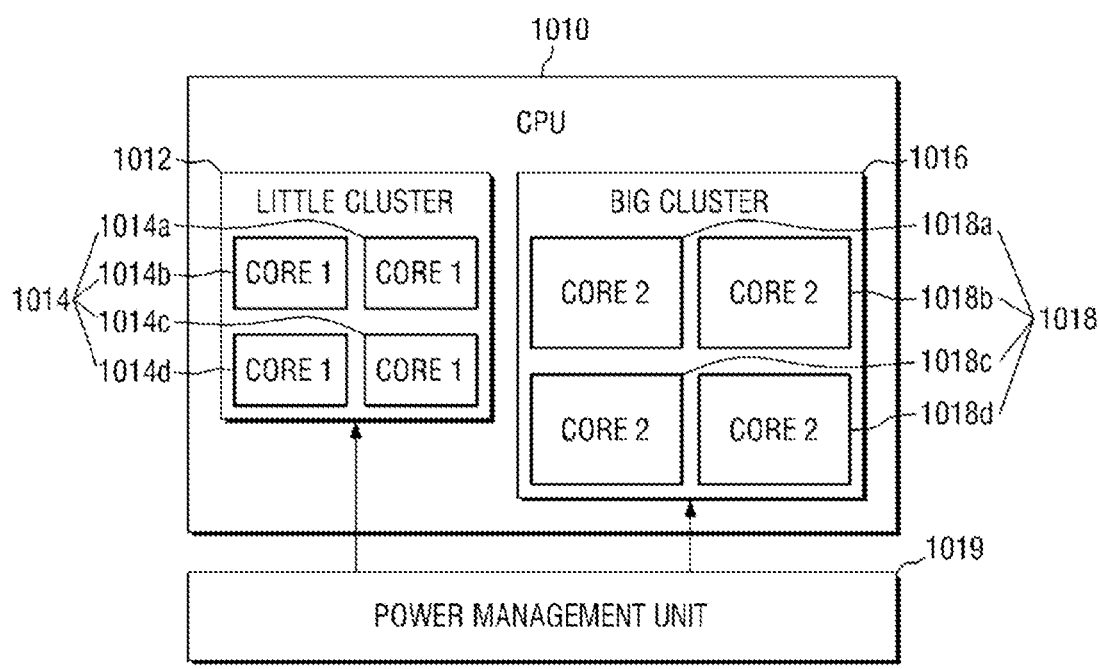
FIG. 15 is a block diagram schematically illustrating a central processing unit (CPU) shown in FIG. 14.
Figure 16:
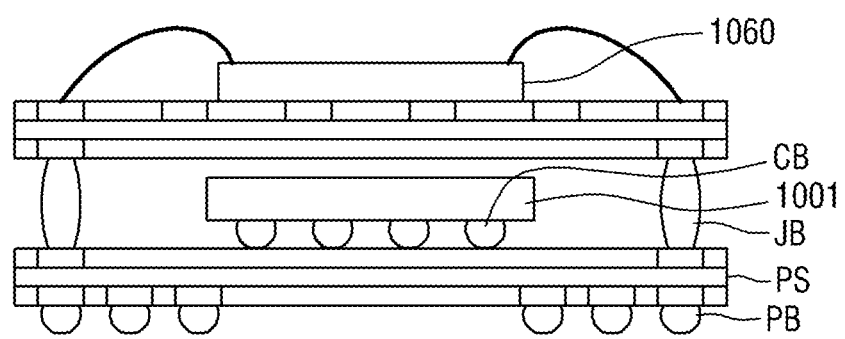
FIG. 16 illustrates a state in which the semiconductor device shown in FIG. 14 is packaged.

FIG. 14 is a block diagram of a system on chip (SoC) system including the semiconductor device shown in FIG. 8, FIG. 15 is a block diagram schematically illustrating a central processing unit (CPU) shown in FIG. 14 and FIG. 16 illustrates a state in which the semiconductor device shown in FIG. 14 is packaged.

First, referring to FIG. 14, according to example embodiments, a SoC system 1000 includes an application processor 1001 and tangible memory, such as at least one DRAM 1060.

The application processor 1001 is hardware and may include a central processing unit (CPU) 1010, a multimedia system 1020, a bus 1030, a memory system 1040, and a peripheral circuit 1050.

The CPU 1010 may execute computations required to drive the SoC system 1000. In example embodiments, the CPU 1010 may be configured by multi-core environments including a plurality of cores.

Meanwhile, in example embodiments, as shown in FIG. 15, the CPU 1010 may be configured to include a first cluster 1012 and a second cluster 1016.

The first cluster 1012 may be positioned within the CPU 1010. The first cluster 1012 may include n first cores 1014 (Here, n is a natural number.). In FIG. 15, for brevity, a case where the first cluster 1012 includes 4 first cores 1014a to 1014d (e.g., n=4) is described as non-limiting example, but example embodiments are not limited thereto.

Like the first cluster 1012, the second cluster 1016 may also be positioned within the CPU 1010 and may include n second cores 1018. As shown, the second cluster 1016 may be positioned separately from the first cluster 1012. In FIG.

15, for brevity, a case where the second cluster 1016 includes 4 second cores 1018a to 1018d (e.g., n=4) is described as a non-limiting example, example embodiments are not limited thereto.

Meanwhile, FIG. 15 illustrates that the number of first cores 1014 included in the first cluster 1012 and the number of second cores 1018 included in the second cluster 1016 are equal to each other, but example embodiments are not limited thereto. For example, in example embodiments, the number of first cores 1014 included in the first cluster 1012 and the number of second cores 1018 included in the second cluster 1016 may be different from each other, unlike in FIG. 15.

In addition, FIG. 15 illustrates that only the first cluster 1012 and the second cluster 1016 are positioned within the CPU 1010, but example embodiments are not limited thereto. For example, a third cluster (not shown) different from the first and second clusters 1012 and 1016 and including third cores may further be provided within the CPU 1010.

In example embodiments, a unit time computation amount of the first cores 1014 included in the first cluster 1012 and a unit time computation amount of the second cores 1018 included in the second cluster 1016 may be different from each other.

In example embodiments, the first cluster 1012 may be, for example, a little cluster, and the second cluster 1016 may be, for example, a big cluster. In this case, the unit time computation amount of the first cores 1014 included in the first cluster 1012 may be smaller than the unit time computation amount of the second cores 1018 included in the second cluster 1016.

Therefore, the unit time computation amount in a case where all of the first cores 1014 included in the first cluster 1012 are enabled to perform computations may be smaller than the unit time computation amount in a case where all of the second cores 1018 included in the second cluster 1016.

Meanwhile, in example embodiments, unit time computation amounts of first-first to first-fourth cores 1014a to 1014d included in the first cluster 1012 may be equal to each other, and unit time computation amounts of second-first to second-fourth cores 1018a to 1018d included in the second cluster 1016 may also be equal to each other. That is to say, assuming that the unit time computation amounts of the first-first to first-fourth cores 1014a to 1014d are 10, for example, the unit time computation amounts of the second-first to second-fourth cores 1018a to 1018d may be 40, respectively.

A power management unit 1019 may enable or disable the first cluster 1012 and/or the second cluster 1016 when necessary. In detail, when a computation by the first cluster 1012 is required, the power management unit 1019 may enable the first cluster 1012 while disabling the second cluster 1016. Conversely, when a computation by the second cluster 1016 is required, the power management unit 1019 may enable the second cluster 1016 while disabling the first cluster 1012. In addition, when the first-first core 1014a included in the first cluster 1012 has a computation amount large enough to perform necessary computations, the power management unit 1019 enables the first cluster 1014a and disables the second cluster 1016, while enabling the first-first core 1014a and disabling first-second to first-fourth cores 1014b to 1014d in the first cluster 1012.

In other words, in example embodiments, the power management unit 1019 may determine whether to enable all of the first and second clusters 1012 and 1016 or to enable each of the first-first to first-fourth cores 1014a to 1014d included in the first cluster 1012 and each of the second-first to second-fourth cores 1018a to 1018d included in the second cluster 1016.

In example embodiments, the power management unit 1019 may enable the first and second clusters 1012 and 1016 and/or the plurality of cores 1014a to 1014d and 1018a to 1018d included therein by driving the first and second clusters 1012 and 1016 and/or the plurality of cores 1014a to 1014d and 1018a to 1018d included therein by supplying power thereto. In addition, the power management unit 1019 may disable the first and second clusters 1012 and 1016 and/or the plurality of cores 1014a to 1014d and 1018a to 1018d included therein by reducing and/or preventing the first and second clusters 1012 and 1016 and/or the plurality of cores 1014a to 1014d and 1018a to 1018d from being driven by interrupting power from being supplied thereto.

The power management unit 1019 may manage the overall power consumption of the SoC system 1000 by enabling particular clusters 1012 and 1016 and/or the plurality of cores 1014a to 1014d and 1018a to 1018d included therein according to the operating environment of the SoC system 1000.

Referring again to FIG. 14, the multimedia system 1020 may be used when the SoC system 1000 performs various multimedia functions. The multimedia system 1020 may include a 3D engine module, a video codec, a display system, a camera system, and a post-processor.

The bus 1030 may be used when the CPU 1010, the multimedia system 1020, the memory system 1040, and the peripheral circuit 1050 perform data communication with each other. In example embodiments, the bus 1030 may have a multi-layer structure. In detail, examples of the bus 1030 may include a multi-layer advanced high-performance bus (AHB) or a multi-layer advanced eXtensible interface (AXI), but example embodiments are not limited thereto.

The memory system 1040 may provide an environment required for high-speed operation of the application processor 1001 connected to an external memory (for example, DRAM 1060). In example embodiments, the memory system 1040 may include a separate controller (for example, a DRAM controller) for controlling the external memory (for example, DRAM 1060).

The peripheral circuit (1050) can provide circumstance necessary to let SoC system(1000) to access outer device(for example, main board) easily. Therefore, the peripheral circuit(1050) can include various interface, which let the outer device connected to SoC system(1000) be able to compatible.

The DRAM 1060 may function as a working memory for the application processor 1001 to operate. In example embodiments, as shown, the DRAM 1060 may be positioned outside the application processor 1001. In detail, as shown in FIG. 16, the DRAM 1060 may be packaged with the application processor 1001 in the form of a package on package (PoP).

Referring to FIG. 16, the semiconductor package may include a package substrate (PS), a DRAM 1060, and an application processor 1001.

The package substrate PS may include a plurality of package balls PBs. The plurality of package balls PBs may be electrically connected to chip balls CBs of the application processor 1001 through signal lines in the package substrate PS and may be electrically connected to joint balls JBs through the signal lines in the package substrate PS.

Meanwhile, as shown in FIG. 16, the DRAM 1060 may be electrically connected to the joint balls JBs by wire bonding.

The application processor 1001 may be positioned under the DRAM 1060. The chip balls CBs of the application processor 1001 may be electrically connected to the DRAM 1060 through the joint balls JBs.

Meanwhile, FIG. 16 illustrates that the DRAM 1060 is positioned only outside of the application processor 1001, but example embodiments are not limited thereto. For example, the DRAM 1060 may also be positioned inside the application processor.

At least one of components of the SoC system 1000 may be manufactured using the layout design systems 1 and 2 according to example embodiments. The semiconductor device 3 according to example embodiments may be provided as one of the components of the SoC system 1000.

Next, an electronic system including semiconductor devices according to example embodiments will be described with reference to FIG. 17.

Figure 17:
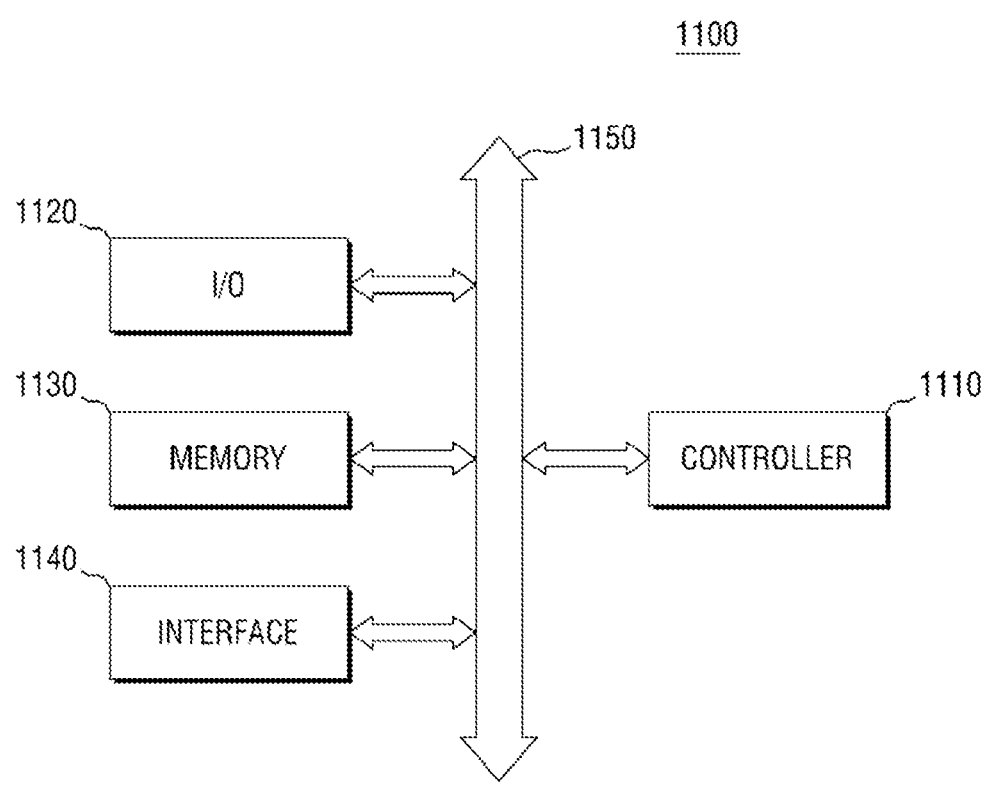
FIG. 17 is a block diagram of an electronic system including the semiconductor device shown in FIG. 8.

FIG. 17 is a block diagram of an electronic system including the semiconductor device shown in FIG. 8.

Referring to FIG. 17, according to example embodiments, an electronic system 1100 may include a controller 1110, an input/output device (I/O) 1120, a memory device 1130, an interface 1140 and a bus 1150. The controller 1110, the I/O 1120, the memory device 1130 and/or the interface 1140 may be connected to each other through the bus 1150. The bus 1150 corresponds to a path along which data moves.

The controller 1110 may include hardware such as at least one of a microprocessor, a digital signal processor, a microcontroller, and logic devices capable of performing functions similar to those of these components. The I/O 1120 may include hardware such as a keypad, a keyboard, a display, and so on. The memory 1130 may be a tangible storage medium that is configured to store data and/or commands. The interface 1140 may transmit data to a communication network or receive data from the communication network. The interface 1140 may be wired or wireless. For example, the interface 1140 may include an antenna or a wired/wireless transceiver.

Although not shown, the electronic system 1100 is a working memory for improving the operation of the controller 1110 and may further include a high-speed DRAM and/or SRAM.

The working memory 1130 may be manufactured using the layout design systems 1 and 2 according to example embodiments. In example embodiments, at least one of the memory devices 81a and 81b described above with reference to FIGS. 11-12, may be used as the memory device 1130 or may be provided as part of the controller 1110 or the I/O 1120.

The electronic system 1100 may be applied to a personal digital assistant (PDA), a portable computer, a web tablet, a wireless phone, a mobile phone, a digital music player, a memory card, or any type of electronic device capable of transmitting and/or receiving information in a wireless environment.

Figure 18:
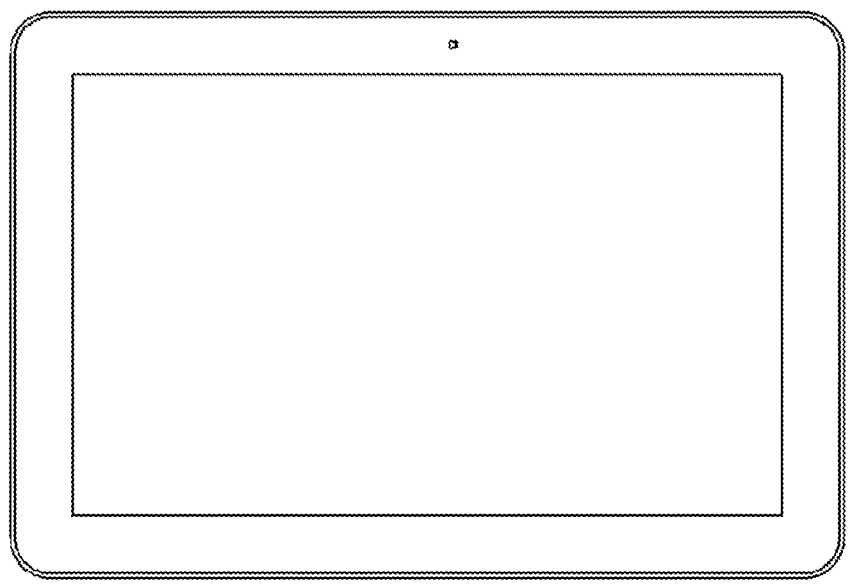
FIGS. 18 to 20 illustrate semiconductor systems to which the semiconductor device shown in FIG. 8 can be applied.
Figure 19:
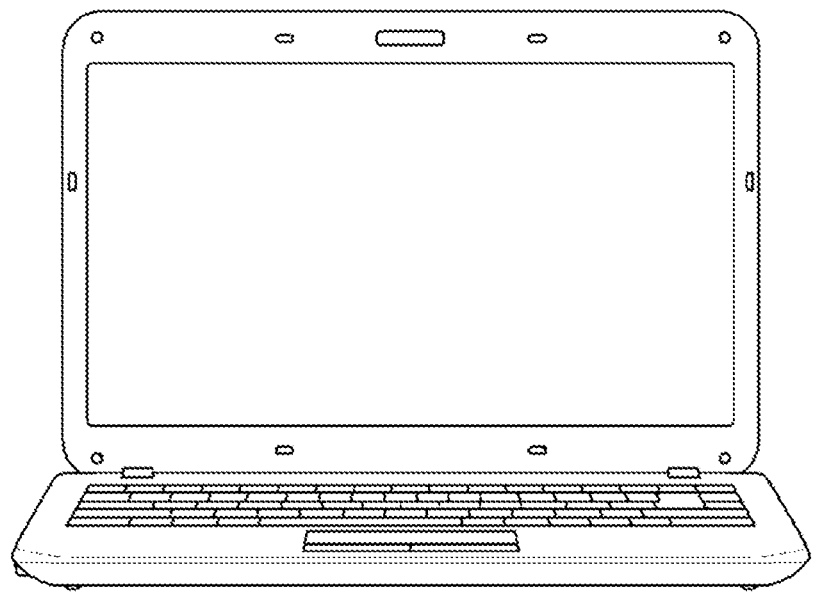
Figure 20:
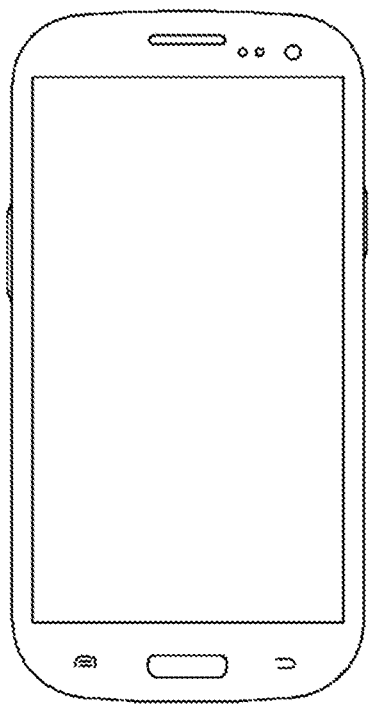

FIGS. 18 to 20 illustrate semiconductor systems to which the semiconductor device shown in FIG. 8 can be applied.

FIG. 18 illustrates a tablet PC 1200. FIG. 19 illustrates a notebook computer 1300. FIG. 20 illustrates a smart phone 1400. In example embodiments, the semiconductor device 3 described above with reference to FIG. 8 can be applied to the tablet PC 1200, the notebook computer 1300, the smart phone 1400, or the like.

Semiconductor devices according to example embodiments may be applied to other integrated circuit devices not illustrated herein. In other words, the tablet PC 1200, the notebook computer 1300, and the smart phone 1400 are provided as examples of semiconductor systems according to example embodiments, but example embodiments are not limited thereto. In example embodiments, the semiconductor systems can be incorporated into a variety of different types of devices, such as computers, ultra mobile personal computers (UMPCs), work stations, net-books, personal digital assistants (PDAs), portable computers, web tablets, wireless phones, mobile phones, smart phones, e-books, portable multimedia players (PMPs), portable game consoles, navigation devices, black boxes, digital cameras, 3-dimensional televisions, digital audio recorders, digital audio players, digital video recorders, digital video players, and so on.

Hereinafter, a method for manufacturing the semiconductor device shown in FIG. 8 will be described with reference to FIGS. 21 to 28. That is to say, a method for manufacturing the semiconductor device shown in FIG. 8 will be described using the above-described layout design systems. For example, the layout design system 1 or 2 according to example embodiments described with reference to FIGS. 1 to 5 and 6-7 may be used for the method in FIGS. 21 to 228.

Figure 21:
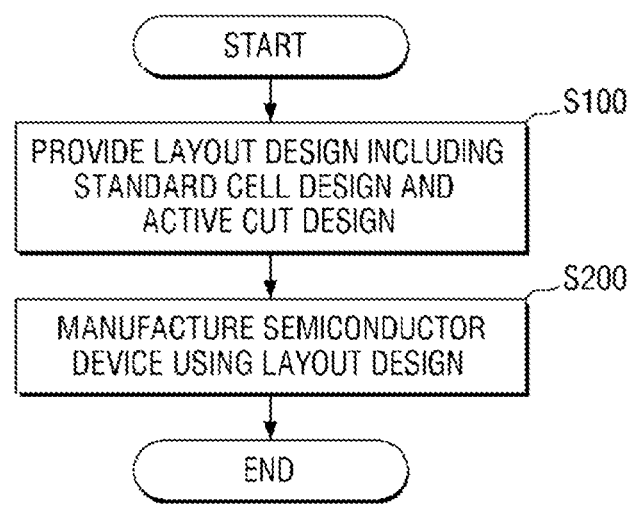
FIG. 21 is a flowchart illustrating a method for manufacturing the semiconductor device shown in FIG. 8.

FIG. 21 is a flowchart illustrating a method for manufacturing the semiconductor device shown in FIG. 8, and FIGS. 22 to 28 illustrate intermediate process steps for explaining the method for manufacturing the semiconductor device shown in FIG. 8.

Referring to FIG. 21, first, a layout design including a standard cell design and an active cut design is received (S100).

In detail, the layout design including a standard cell design and an active cut design may be received from the layout design system 1 or 2 according to example embodiments. A process of generating the layout design will now be described. The process of generating the layout design is largely divided into a first layout design step and a second layout design step. Here, the layout design may correspond to the chip design 50, but example embodiments are not limited thereto.

Figure 22:
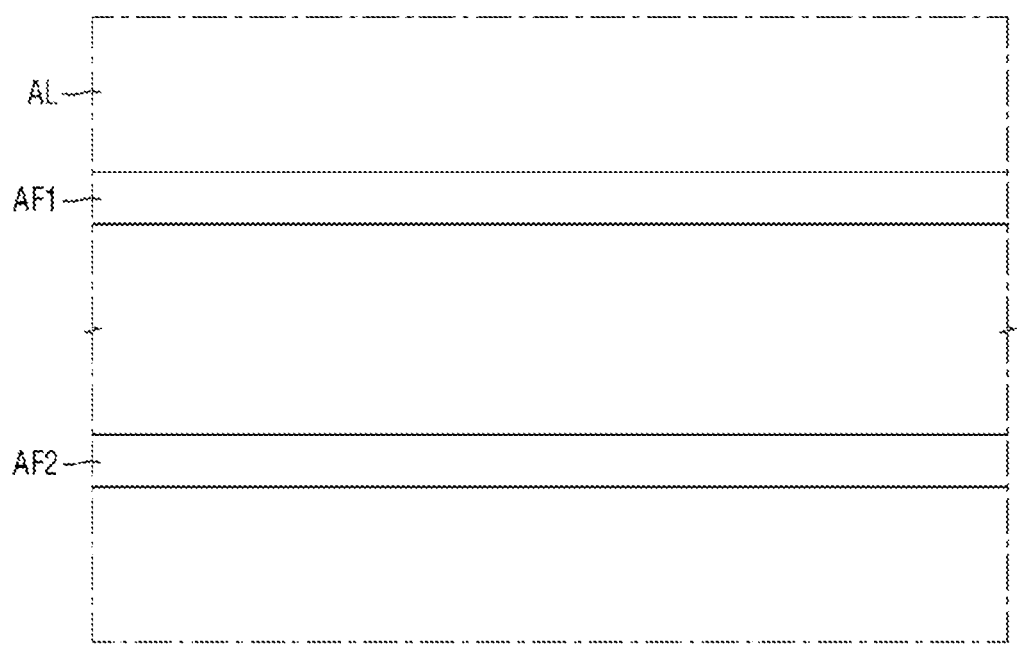
FIGS. 22 to 28 illustrate intermediate process steps for explaining a method for manufacturing the semiconductor device shown in FIG. 8 according to example embodiments.
Figure 22:
Figure 23:
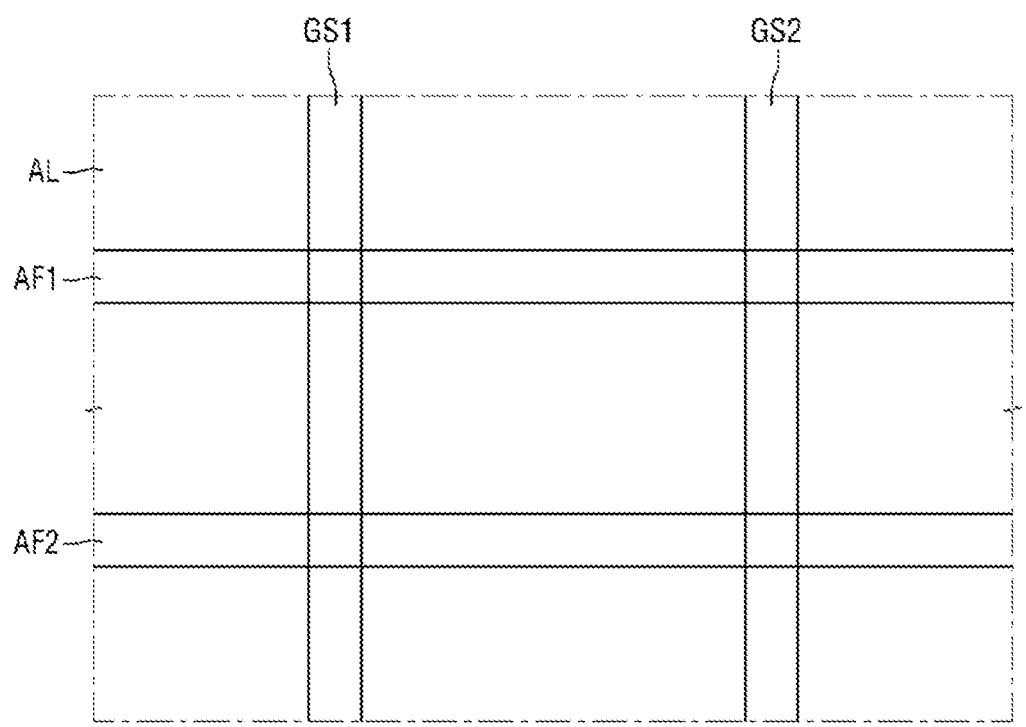

First, referring to FIGS. 22 and 23, the first layout design step may include generating designs of first and second active fins AF1 and AF2 on an active layer AL extending in a first direction X and generating designs of first and second gate structures GS1 and GS2 on the first and second active fins AF1 and AF2 extending in a second direction.

Figure 24:
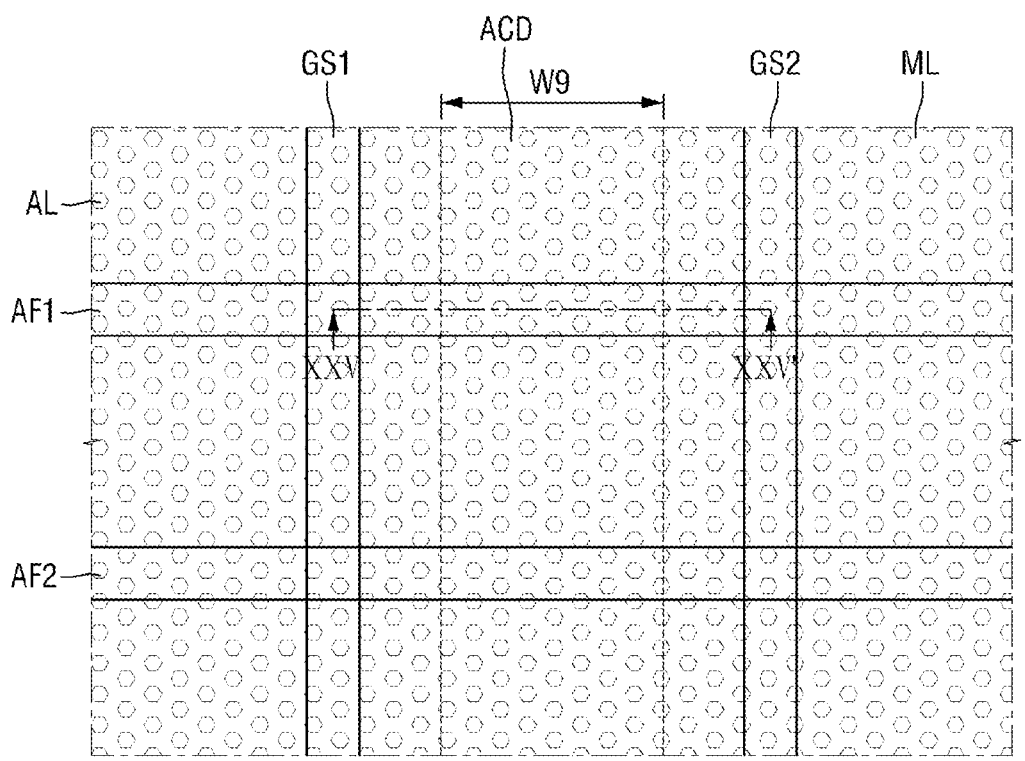

Next, referring to FIG. 24, after the first layout design step is performed, the second layout design step may be performed to design an active cut design ACD defining a patterning area of a mask layer ML. Here, a width in the first direction X of the active cut design ACD may include a ninth width W9, which may be adjusted by the markers MK1 and MK2 shown in FIG. 4.

Referring again to FIG. 21, a semiconductor device is manufactured using the received layout design (S200).

Figure 25:
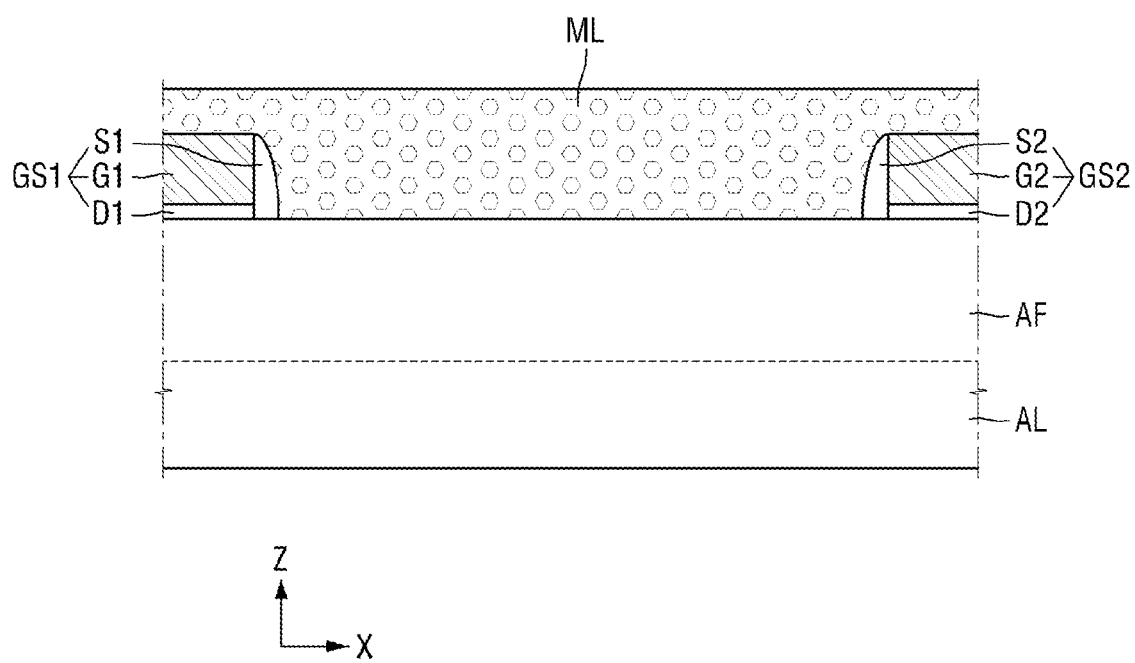

In detail, active fins AF1 and AF2 and gate structures GS1 and GS2 may first be formed using the received layout design. The process of forming the active fins AF1 and AF2 and the gate structures GS1 and GS2 will now be described in detail with reference to FIGS. 22 to 25. FIG. 25 is a cross-sectional view taken along the line XXV-XXV' of FIG. 24.

Referring to FIGS. 22 to 25, according to example embodiments, the layout design is received from the layout design systems, and the first and second active fins AF1 and AF2 extending in the first direction X and spaced apart from each other in the second direction Y and the gate structures GS1 and GS2 extending in the second direction Y and spaced apart from each other in the first direction X may be formed on the active layer AL using the received layout design. Here, the gate structures GS1 and GS2 may include dummy gates or normal gates. Although examples have been described where the numbers of active fins and gate structures are 2, respectively example embodiments are not limited thereto. That is to say, more than two active fins and gate structures may exist.

The mask layer ML is formed on the gate structures GS1 and GS2 and the active fins AF1 and AF2.

The mask layer ML may include, for example, a photo resist layer or an insulation layer, but example embodiments are not limited thereto.

In addition, as shown in FIG. 24, the active cut design ACD is indicated on the mask layer ML, and the active cut design ACD may be included in the received layout design.

Figure 26:
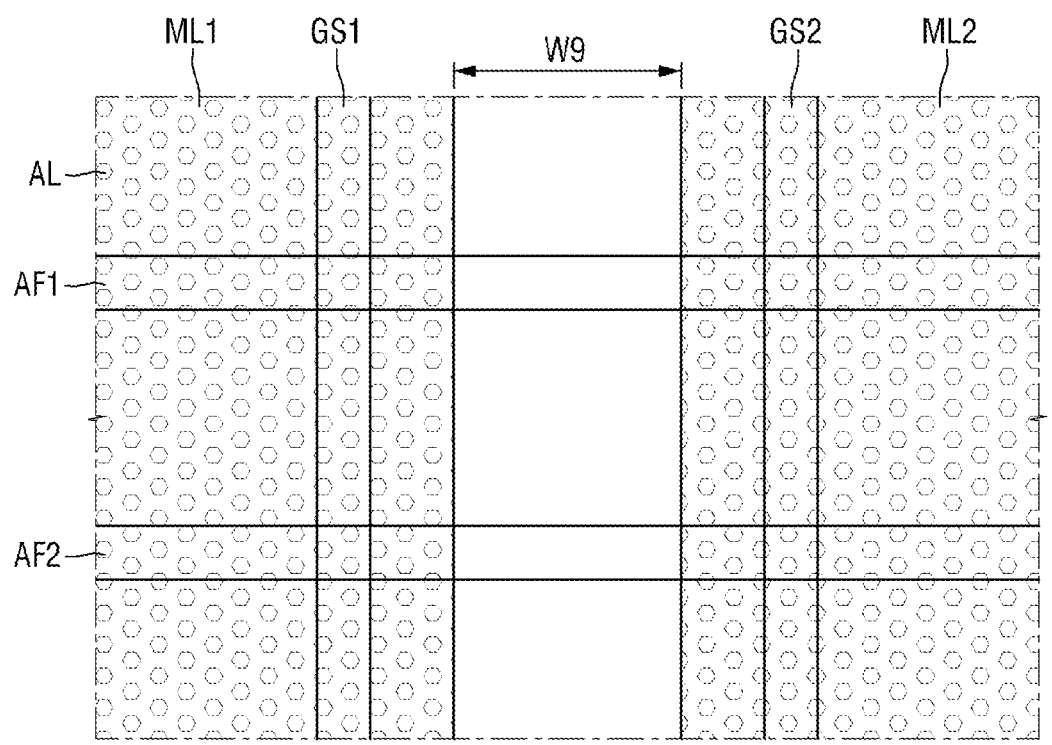

Referring to FIG. 26, the mask layer ML is patterned.

In detail, a portion of the mask layer ML overlapping with the active cut design ACD shown in FIG. 24 may be removed. Further, the mask layer ML is patterned, thereby forming a first mask layer ML1 and a second mask layer ML2.

Figure 27:
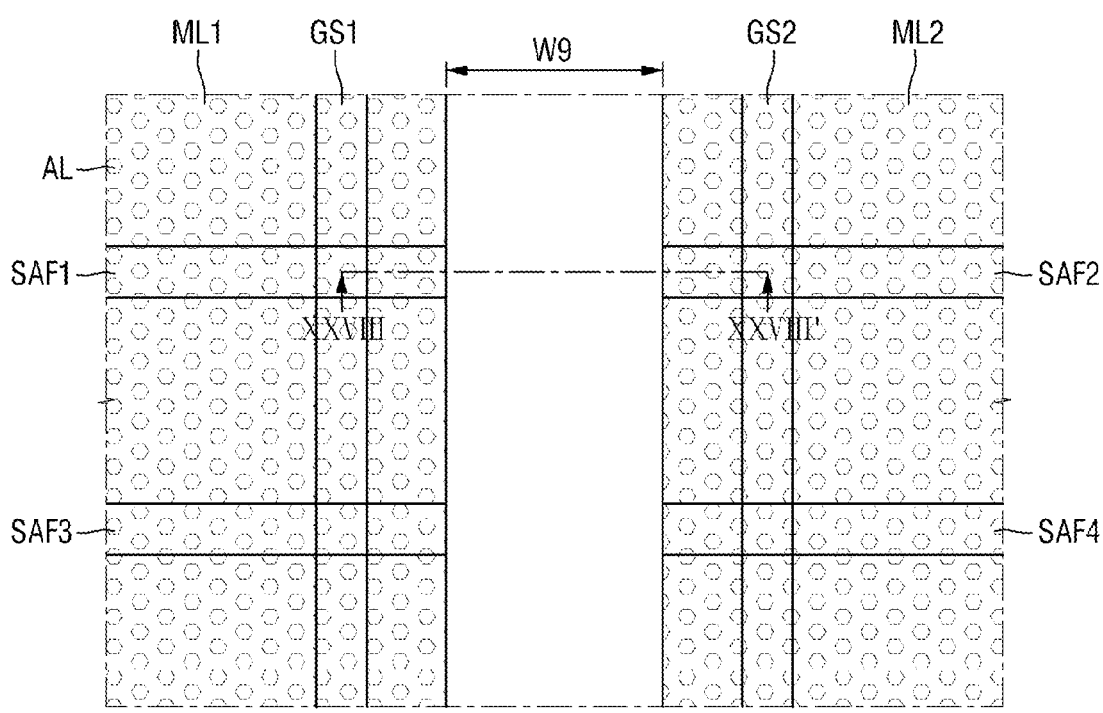

Referring to FIG. 27, the active fins AF1 and AF2 and the portion of the active layer AL overlapping with the active cut design ACD shown in FIG. 24 may be removed using the first mask layer ML1 and the second mask layer ML2 as masks.

As the result of the removing, the first active fin AF1 may be separated into a first sub active fin SAF1 and a second sub active fin SAF2, and the second active fin AF2 may be separated into a third sub active fin SAF3 and a fourth sub active fin SAF4. A gap between the first and second sub active fins SAF1 and SAF2 and a gap between the third and fourth sub active fins SAF3 and SAF4 may include the ninth width W9, which is equal to the width in the first direction X of the active cut design ACD. Here, the meaning 'being equal' used herein may include not only 'being completely the same' but 'encompassing a process error' that may be generated during a fabrication process.

Figure 28:
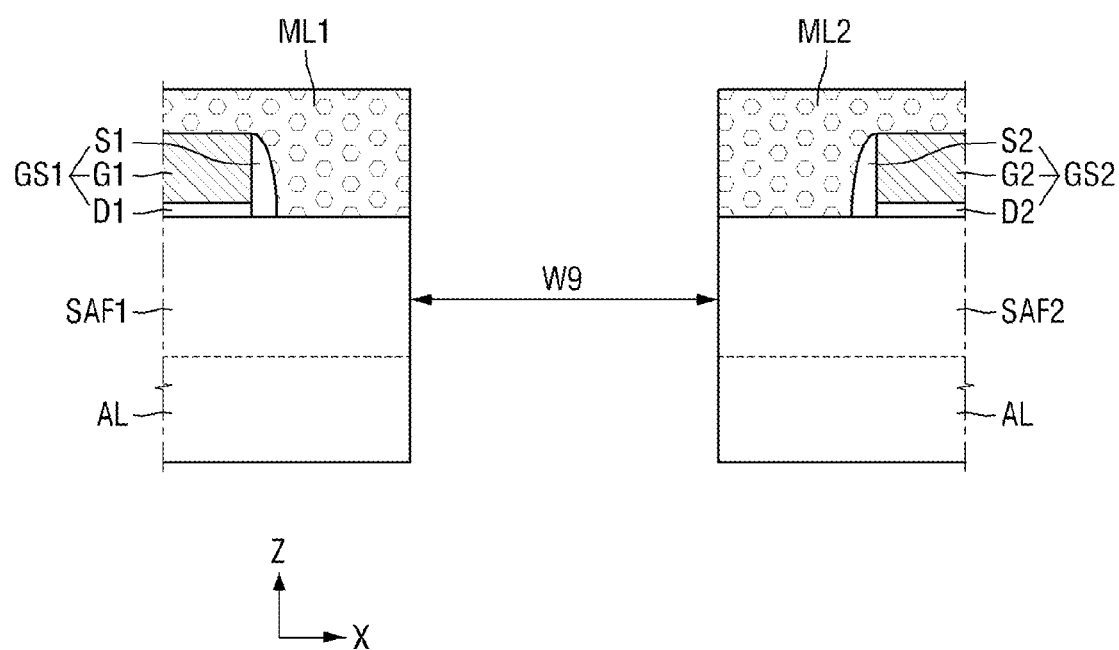

FIG. 28 is a cross-sectional view taken alone line XXVIII-XVIII' of FIG. 27. FIG. 28 illustrates a state in which the first active fin AF1 and a portion of the active layer AL are removed, but example embodiments are not limited thereto. That is to say, the active layer AL may not be removed but only the portion of the first active fin AF1 may be removed.

Through the above-described manufacturing method, the active cut design ACD set in the design step overlaps the removed portions of the active fins AF1 and AF2 while not overlapping with the patterned mask layers ML1 and ML2.

Although not shown, the mask layer ML1 and ML2 may be removed after removing the portions of the active fins AF1 and AF2. Next, as shown in FIG. 10, an isolation layer (160 of FIG. 10) may be formed to cover bottom portions of the removed active fins AF1 and AF2 and side surfaces of the active layer AL. In addition, a source/drain region (145 of FIG. 10) may be formed on both sides of intersections between the gate structures GS1 and GS2 and the first to fourth sub active fins SAF1 to SAF4. In addition, when necessary, a self-aligned contact (110 of FIG. 10) may be formed to electrically connect the first sub active fin SAF1 and the second sub active fin SAF2 or the third sub active fin SAF3 and the fourth sub active fin SAF4 to each other.

While some example embodiments have been particularly shown and described, it will be understood by one of ordinary skill in the art that variations in form and detail may be made therein without departing from the spirit and scope of the claims.

What is claimed is:

1. A layout design system comprising:
a processor;
a storage module configured to store a standard cell design, the standard cell design including an active area and a normal gate area on the active area; and
a generation module,
the generation module being configured to receive the standard cell design,
the generation module being configured to adjust a width of an active cut design crossing the active area of the standard cell design,
the generation module being configured to output a chip design including a design element using the processor,
the design element including the active cut design having the width adjusted, and
the generation module being configured to adjust the width of the active cut design using a marker, wherein
the standard cell design includes a first standard cell design and a second standard cell design,
the first standard cell design includes a first active area extending in a first direction,
the second standard cell design includes a second active area extending in the first direction,
the first and second active areas are spaced apart from each other in the first direction,
the active cut design is between the first standard cell design and the second standard cell design,
the active cut design includes a first part spaced apart from a second part in the first direction,
the first part is one end of the active cut design facing the first active area,
the second part is an other end of the active cut design facing the second active area,
the marker includes a first marker and a second marker,
the generation module is configured to adjust a width of the first part of the active cut design in the first direction using the first marker, and
the generation module is configured to adjust a width of the second part of the active cut design in the first direction using the second marker,
the first marker is generated on a boundary between the first active area and the first part of the active cut design so as to overlap with the first active area and the first part of the active cut design, and
the second marker is generated on a boundary between the second active area and the second part of the active cut design so as to overlap with the second active area and the second part of the active cut design.

2. The layout design system of claim 1, wherein
the first standard cell design further includes a first normal gate area on the first active area,
the first normal gate area extends in a second direction crossing the first direction, and
the generation module is configured to adjust a distance between the first normal gate area and the first part using the first marker.

3. The layout design system of claim 2, wherein
the first standard cell design further includes a first dummy gate area on the first active area,
the first dummy gate area is spaced apart from the first normal gate area in the first direction,
the first dummy gate area is between the first normal gate area and the first part, and
the first marker does not overlap with the first dummy gate area.

4. The layout design system of claim 1, wherein
the first standard cell design further includes a first active fin extending in the first direction on the first active area, and
the generation module is configured to adjust a length of the first active fin in the first direction using the first marker.

5. The layout design system of claim 4, wherein the length of the first active fin in the first direction is equal to a length of the first active area in the first direction.

6. The layout design system of claim 1, wherein the standard cell design further includes the design element.

7. The layout design system of claim 1, wherein the generation module is configured to generate the design element.

8. A layout design system comprising:
a processor;
a storage module configured to store a plurality of standard cell designs and a plurality of candidate active cut designs,
the plurality of candidate active cut designs having different shapes,
each of the standard cell designs including an active area and a normal gate area on the active area;
a displacement module,
the displacement module being configured to place the plurality of standard cell designs using the processor according to a defined requirement received by the displacement module, and
the displacement module being configured to select one of the plurality of candidate active cut designs and to dispose the selected candidate active cut design between the plurality of standard cell designs; and
a generation module,
the generation module being configured to generate a chip design using an input generated from the displacement module,
the input including the selected one of the candidate active cut designs disposed between the plurality of standard cell designs, and
the generation module being configured to adjust a with of the selected one of the candidate active cut designs in response to the defined requirement so the chip design generated by the generation module includes the selected one of the candidate active cut designs having the width adjusted.

9. The layout design system of claim 8, wherein
each one of the standard cell designs includes a first standard cell design and a second standard cell design,
the first standard cell design includes a first active area extending in a first direction,
the second standard cell design includes a second active area extending in the first direction,
the first and second active areas are spaced apart from each other in the first direction,
and the displacement module is configured to dispose the selected candidate active cut design between the first standard cell design and the second standard cell design.

10. The layout design system of claim 9, wherein
the generation module is configured to generate a first marker and a second marker,
the first marker is on a boundary between the first standard cell design and the selected candidate active cut design, and
the second marker is on a boundary between the second standard cell design and the selected candidate active cut design.

11. The layout design system of claim 10, wherein the displacement module and the generation module are stored in the storage module or stored in an other storage module separated from the storage module.

12. The layout design system of claim 10, further comprising:
an integration module, wherein
the integration module is configured to implement the displacement module and the generation module.

13. A layout design system comprising:
a processor;
a storage module configured to store at least one standard cell design,
the standard cell design including at least one gate area on an active area; and
a generation module configured to generate a chip design including a design element using the processor by adjusting a width of an active cut design crossing the active area,
the design element including the active cut design having the width adjusted, wherein
the active area includes a first active area spaced apart in a first direction from a second active area,
the standard cell design includes the active cut design,
the active cut design is between the first and second active areas,
the active cut design includes a first part spaced apart in the first direction from a second part,
the generation module is configured to adjust the width of the active cut design by adjusting a width in the first direction of the first part using a first marker and adjusting a width in the first direction of the second part using a second marker,
the first marker overlaps a boundary between the first part and the first active area,
the second marker overlaps a boundary between the second part and the second active area, and
the first and second markers do not overlap the at least one gate.

14. The layout design system of claim 13, wherein
the generation module is configured to adjust the width of the active cut design without affecting a dimension of the at least one gate.

15. The layout design system of claim 13, further comprising:
a displacement module, wherein
the at least one standard cell design is a plurality of standard cell designs,
the storage module is configured to store the plurality of standard cell designs and a plurality of candidate active cut designs,
the plurality of candidate active cut designs have different shapes,
the displacement module is configured to place the plurality of standard cell designs using the processor according to a defined requirement,
the displacement module is configured to select one of the plurality of candidate active cut designs and to dispose the selected candidate active cut design between the plurality of standard cell designs such that the selected candidate active cut design is the active cut design crossing the active area of the standard cell, and the generation module is configured to adjust a width of the selected candidate active cut design using a marker without affecting a dimension of the at least one gate.

16. The layout design system of claim 13, wherein the storage module is one of a non-volatile memory device, a hard disk drive, and a magnetic storage device.

* * * * *